United States Patent [19]
Gupta

[11] Patent Number: 5,774,831
[45] Date of Patent: Jun. 30, 1998

[54] SYSTEM FOR IMPROVING AVERAGE ACCURACY OF SIGNALS FROM GLOBAL POSITIONING SYSTEM BY USING A NEURAL NETWORK TO OBTAIN SIGNAL CORRECTION VALUES

[76] Inventor: Surender Kumar Gupta, 11 Nanyang View, Singapore 639624, Singapore

[21] Appl. No.: 760,889

[22] Filed: Dec. 6, 1996

[51] Int. Cl.$^6$ .................................................. G01C 21/00
[52] U.S. Cl. ........................... 701/214; 342/357; 342/457
[58] Field of Search .................................. 701/214, 213; 342/357, 457; 395/21, 902

[56] References Cited

U.S. PATENT DOCUMENTS

| | | | |
|---|---|---|---|
| 3,630,079 | 12/1971 | Hughes | 73/178 |
| 3,941,984 | 3/1976 | Chappell et al. | 235/150.27 |
| 4,578,678 | 3/1986 | Hurd | 343/357 |
| 4,672,382 | 6/1987 | Fukuhara et al. | 342/357 |
| 4,812,991 | 3/1989 | Hatch | 364/458 |
| 5,089,983 | 2/1992 | Chiang | 364/844 |
| 5,177,489 | 1/1993 | Hatch | 342/357 |
| 5,455,890 | 10/1995 | Wang | 395/22 |
| 5,475,768 | 12/1995 | Diep et al. | 382/156 |
| 5,495,257 | 2/1996 | Loomis | 342/357 |
| 5,530,393 | 6/1996 | Guerrieri et al. | 327/355 |
| 5,548,512 | 8/1996 | Quraishi | 364/424.02 |
| 5,564,079 | 10/1996 | Olsson | 455/54.1 |

OTHER PUBLICATIONS

Blackwell, E.G., *Overview of Differential GPS Methods,* Global Positioning System, vol. III, The Institute of Navigation, 1986, pp. 89–99.

Sharret, P.; Wysocki, J.; Freeland, G.; Brown, D. and Netherland, S., *GPS Performance: An Initial Assessment,* Navigation: Journal of The Institute of Navigation, vol. 39, No. 1, Spring 1992.

Creamer, P.M.; Alsip, D.H. and Radziszewski, J.P., *Performance Requirements for the Coast–Guard's Differential GPS Service,* Navigation: Journal of The Institute of Navigation, vol. 40, No. 4, Winte 1993–1994, pp. 375–393.

Conley, R., *GPS Performance: What Is Normal,* Navigation: Journal of The Institute of Navigation, vol. 40, No. 3, Fall 1993, pp. 261–281.

Parkinson, B.W.; Stansell, T.; Beard R. and Gromov, K., *A History of Satellite Navigation,* Navigation: Journal of The Institute of Navigation, vol. 42, No. 1, Spring 1995, pp. 109–164.

Kee, C.; Parkinson, B.W. and Axelrad, P., *Wide Area Differential GPS,* Navigation: Journal of The Institute of Navigation, vol. 38, No. 2, Summer 1991.

Ashkenzaki, V.; Hill, C.J. and Nagel, J., *Wide Area Differential GPS: A Performance Study,* Proceedings of the ION GPS–92, Albuquerque, Sep. 1992, pp. 589–598.

Kee, C. and Parkinson, B.W., *Wide Area Differential GPS as a Future Navigation System in the U.S.* Proceedings Plans '94, Las Vegas, Apr. 1994, pp. 788–795.

Frye, E.O., *The Institute of Navigation—The Second Quarter–Century,* Navigation: Journal of the Institute of Navigation, vol. 42, No. 1, Spring 1995, pp. 27–50.

Gupta, S.K.; Ngiam, K.W.; Ngiam, T.C. and Mital, D.P., *Requirements Analysis of Differential GPS for Singapore,* Proceedings Plans '94, Las Vegas, Apr. 1994, pp. 233–238.

Vizard, F., *New Directions for GPS,* Popular Science, Dec. 1996, pp. 92–96.

(List continued on next page.)

*Primary Examiner*—Michael Zanelli
*Attorney, Agent, or Firm*—Panitch Schwarze Jacobs & Nadel, P.C.

[57] ABSTRACT

A neural network is used to process raw, uncorrected signals received by a Global Positioning System (GPS) receiver to obtain signal corrections which are used to correct the raw signals and obtain highly accurate position coordinate data. The neural network is trained with a particular GPS receiver. Once the neural network is trained, the weight matrices used for the particular GPS receiver may be used in different GPS receivers without requiring training of the different GPS receivers.

30 Claims, 16 Drawing Sheets

OTHER PUBLICATIONS

Gupta, S.K.; Jin, F.S.; and Leong, K.A., *An Intelligent Small Area DGPS,* IEEE, Apr. 1996, pp. 169–173.

Dan Simon et al.; *Navigation Satellite Selection Using Neural Networks;* Neurocomputing; vol. 7, No. 3; Apr. 1995; pp. 247–258.

Y. J. Wang et al.; *A Neural Network Approach to Anti–SA Modelling for GPS Users;* IEEE Conf.: Gold Coast, QLD., Australia; Aug. 16–21, 1992; pp. 658–661.

| Table of Values for Weight Matrix V (10x1-39) (part 1 of matrix) |||||||||
|---|---|---|---|---|---|---|---|---|
| -17.86 | -6.95 | -14.10 | -16.58 | -13.99 | -13.01 | -38.57 | 29.04 | 60.81 | 2.98 |
| -16.74 | -40.10 | -55.62 | -7.59 | 138.64 | -15.25 | -6.22 | -222.50 | 122.44 | 2.68 |
| -6.60 | 29.72 | -50.48 | -71.51 | 231.34 | -1.50 | -140.93 | 200.61 | -15.73 | 1.34 |
| 21.52 | 12.57 | -5.90 | -16.68 | 12.43 | 19.83 | -15.68 | 17.64 | -61.61 | -3.24 |
| 69.70 | 14.65 | -92.37 | -111.53 | -2.61 | 34.20 | 291.50 | 123.07 | -266.88 | -10.25 |
| 69.77 | -4.33 | -31.59 | -193.89 | -60.58 | 35.03 | 355.88 | 64.33 | -245.09 | -9.49 |
| -68.84 | -54.66 | -24.86 | 91.74 | 117.93 | -34.83 | -161.80 | 81.27 | 93.50 | 10.00 |
| -7.59 | 35.08 | 83.37 | 95.90 | -142.68 | -17.10 | 98.90 | -266.88 | 46.61 | 0.95 |
| 67.82 | -4.62 | 48.22 | -102.66 | 142.54 | 40.82 | -0.51 | -210.82 | 6.42 | -9.32 |
| 30.79 | 16.84 | 27.06 | 5.91 | 3.09 | 20.10 | 33.64 | 0.62 | -75.80 | -4.27 |
| 39.08 | 10.50 | -71.09 | -75.55 | 2.26 | 37.53 | -30.69 | 146.85 | 34.37 | -5.24 |
| 28.01 | 30.27 | 57.16 | -62.68 | -90.21 | 23.27 | 23.76 | 102.62 | 23.43 | -3.79 |
| -92.29 | -49.26 | -16.62 | -27.11 | 309.50 | -43.06 | -142.60 | -40.04 | 104.64 | 13.34 |
| 26.88 | 19.36 | 20.49 | 3.78 | -15.18 | 17.52 | 43.94 | -2.18 | -66.08 | -4.20 |
| -2.14 | 12.27 | 16.90 | 47.74 | -65.92 | -3.63 | 47.78 | -6.34 | -72.72 | 0.69 |
| -189.87 | 79.16 | -187.15 | 326.21 | 13.80 | -105.38 | -142.24 | 32.09 | 138.57 | 27.41 |
| -146.63 | -20.31 | -28.28 | 164.29 | -83.28 | -82.85 | -61.14 | 206.74 | -12.72 | 20.63 |
| -31.26 | -55.10 | -156.76 | 76.26 | 107.96 | -26.84 | 32.78 | -214.83 | 109.52 | 4.04 |
| 30.01 | 10.50 | 38.56 | -117.57 | -8.69 | 32.91 | -90.66 | 7.65 | 4.10 | -4.38 |
| 59.53 | 25.18 | 47.05 | -200.90 | 52.27 | 45.80 | -36.76 | 21.79 | -28.91 | -8.84 |
| 88.47 | 116.66 | -44.91 | -170.18 | 136.35 | 48.09 | -104.32 | 134.49 | -211.25 | -13.02 |
| 7.22 | 8.66 | 71.03 | 251.75 | -91.43 | -1.78 | -13.77 | -36.09 | -69.86 | -0.92 |
| -3.12 | -5.57 | -76.47 | 18.08 | -51.66 | -12.60 | -39.83 | 58.51 | -144.80 | -0.01 |
| 50.86 | 12.34 | 158.62 | 209.50 | -29.27 | 39.08 | -74.64 | -25.42 | -157.13 | -7.09 |
| -26.38 | -44.24 | 281.93 | 11.32 | -132.41 | -15.43 | -19.40 | -46.16 | 60.47 | 4.15 |
| -63.87 | -109.91 | 10.30 | 66.40 | 123.33 | -26.08 | -247.85 | -40.72 | 347.67 | 9.35 |
| 44.94 | -18.84 | -18.08 | -63.81 | -15.70 | 43.39 | 262.33 | 15.10 | -291.85 | -6.21 |
| 39.27 | 15.13 | -79.04 | -48.11 | -19.05 | 38.43 | -27.84 | 141.59 | 64.70 | -5.41 |
| -154.81 | -61.44 | -92.51 | -41.18 | -9.42 | -109.59 | 49.63 | -69.26 | 278.63 | 22.25 |
| -11.84 | 2.24 | -89.84 | 72.94 | -60.46 | -15.95 | 110.12 | 51.96 | -6.51 | 1.25 |
| 122.82 | 68.13 | 52.78 | -180.75 | -225.58 | 70.51 | 133.54 | -8.79 | 17.08 | -17.88 |
| 9.25 | -3.86 | 53.17 | 71.46 | 23.49 | 5.58 | -61.43 | -70.08 | 64.47 | -1.13 |
| 102.00 | 28.67 | 2.53 | -44.03 | -8.28 | 60.14 | -65.06 | 127.61 | -159.56 | -14.69 |
| -26.11 | -19.98 | 60.54 | 32.16 | 32.92 | -14.56 | -73.22 | -59.93 | 89.02 | 3.37 |
| 39.31 | 28.72 | 7.22 | -118.29 | 136.93 | 21.55 | -50.55 | -36.30 | -141.61 | -5.99 |
| 15.70 | 26.03 | 95.33 | 57.79 | -6.87 | 8.98 | -69.70 | -143.01 | -0.26 | -1.86 |
| 48.01 | 20.24 | 60.53 | 90.48 | -269.73 | 25.02 | 68.94 | -25.37 | 0.87 | -7.07 |
| 22.87 | 11.86 | 51.11 | 23.32 | 28.61 | 12.07 | -12.12 | 37.00 | 8.21 | -3.36 |
| 208.91 | 19.47 | -185.12 | -475.33 | -87.60 | 122.40 | 206.26 | 96.44 | -137.68 | -29.57 |

FIG. 4(a)

| Table of Values for Weight Matrix V (10x40-70) (part 2 of matrix) | | | | | | | | | |
|---|---|---|---|---|---|---|---|---|---|
| -152.02 | -66.71 | 92.69 | 64.22 | -182.49 | -82.60 | 79.35 | 60.61 | 34.87 | 21.41 |
| -5.53 | 8.47 | 74.92 | 1.51 | 4.06 | 8.28 | 18.29 | -72.00 | 152.14 | 0.26 |
| 88.45 | 67.32 | 43.41 | -258.12 | -148.80 | 53.41 | 29.94 | 192.28 | 65.30 | -12.43 |
| 25.72 | 8.97 | -51.71 | -29.02 | -12.69 | 26.96 | -22.47 | 106.01 | 19.78 | -3.36 |
| -30.48 | 31.20 | -115.24 | -303.29 | 334.99 | 6.87 | 80.68 | 106.49 | -155.98 | 4.54 |
| -37.73 | -30.34 | 202.97 | 69.17 | -126.42 | -12.58 | -54.73 | -44.17 | -27.78 | 4.94 |
| -0.83 | -16.34 | 83.70 | 4.77 | -61.87 | 10.40 | -110.24 | -122.71 | 137.87 | 0.40 |
| -31.65 | -22.52 | -17.11 | -36.86 | 13.69 | -16.34 | -10.81 | -9.44 | -27.61 | 4.92 |
| -54.78 | 29.55 | -132.67 | -371.16 | 349.52 | -34.88 | 125.41 | 51.33 | 73.56 | 8.22 |
| -36.27 | -28.63 | 74.57 | 5.65 | 45.31 | -26.92 | -19.15 | -138.21 | 32.36 | 4.93 |
| -27.22 | -26.08 | 126.37 | 9.97 | -17.67 | -20.29 | -36.77 | -162.61 | -26.95 | 4.02 |
| -20.38 | -13.03 | 44.00 | 62.28 | 7.66 | -11.05 | -85.41 | -22.93 | 79.44 | 3.19 |
| 32.01 | 8.99 | 116.97 | -90.76 | 19.33 | 28.13 | -110.71 | -60.42 | 2.69 | -4.18 |
| 57.90 | -194.64 | 21.70 | 619.00 | -526.01 | 113.93 | -155.76 | -204.53 | 141.84 | -8.11 |
| -37.08 | -57.82 | -50.82 | -37.11 | 335.48 | -13.73 | -152.29 | -136.95 | 9.17 | 5.58 |
| 30.48 | -28.65 | 162.95 | 153.47 | -265.11 | 35.42 | -68.53 | -45.96 | 49.55 | -4.25 |
| -18.78 | -21.30 | 27.14 | -32.32 | 58.46 | -5.64 | -32.28 | -14.22 | -5.07 | 2.58 |
| -106.51 | -1.67 | -23.14 | -120.10 | -79.61 | -69.45 | 153.11 | -31.53 | 202.00 | 14.90 |
| 119.58 | 42.53 | 79.18 | -899.78 | 97.67 | 73.30 | 160.93 | -1.12 | 111.72 | -16.58 |
| 9.49 | -3.21 | 48.68 | 27.41 | -37.33 | 3.38 | -19.05 | 51.16 | 2.16 | -1.16 |
| -84.37 | -69.37 | -107.02 | 4.21 | 115.90 | -49.18 | -8.70 | 197.33 | -2.44 | 11.90 |
| 111.12 | 8.06 | -44.54 | -120.61 | -16.63 | 63.29 | 166.70 | 38.31 | -219.85 | -15.71 |
| -33.98 | -19.06 | -23.75 | 44.26 | 26.90 | -28.93 | -24.59 | -90.18 | 7.42 | 5.02 |
| -50.53 | -8.63 | -0.38 | 24.16 | 3.61 | -33.14 | 57.74 | -84.59 | 119.09 | 7.33 |
| 42.22 | 0.27 | 186.73 | -60.80 | -133.24 | 71.05 | -226.96 | -40.33 | 93.84 | -6.37 |
| -17.97 | 51.33 | 11.75 | 79.45 | -89.12 | -22.05 | 214.84 | -5.06 | -266.29 | 2.70 |
| 123.23 | 105.80 | -61.15 | -356.17 | 18.81 | 79.13 | -107.61 | 395.02 | -105.94 | -17.47 |
| 92.77 | 47.57 | -48.72 | -275.84 | -181.40 | 35.85 | 144.58 | 100.45 | 60.50 | -13.10 |
| 42.15 | 33.02 | -92.02 | -6.88 | -19.79 | 33.69 | 29.32 | 131.70 | 72.19 | -6.21 |
| -33.37 | -11.32 | -212.53 | 76.83 | 185.71 | -37.00 | 119.40 | 85.71 | -14.22 | 5.05 |
| -56.91 | -24.82 | 60.76 | -44.72 | 120.99 | -48.05 | 20.83 | -169.64 | 49.84 | 8.39 |

FIG. 4(b)

| Table of Values for Weight Matrix W (2x71) | | | |
|---|---|---|---|
| W(2x1-36) | | W(2x37-71) | |
| 0.79 | 7.79 | -17.88 | 1.40 |
| 10.50 | -1.45 | -20.13 | -6.11 |
| 12.00 | 0.01 | -19.39 | -0.29 |
| 1.81 | -6.77 | -14.72 | 1.02 |
| -6.43 | 14.94 | -1.93 | 17.15 |
| 10.35 | 53.26 | -17.17 | 3.75 |
| 5.49 | 0.07 | 4.36 | 0.52 |
| -31.81 | 1.77 | -18.66 | 2.67 |
| 16.89 | -0.81 | -10.01 | -0.95 |
| -0.66 | -8.85 | 12.66 | -6.84 |
| 19.49 | -4.07 | 18.43 | 4.58 |
| -6.75 | 1.22 | -20.31 | 0.11 |
| 5.62 | 1.75 | -5.28 | -5.48 |
| -0.57 | -6.00 | 0.54 | -14.19 |
| -5.90 | -1.30 | -0.35 | 9.91 |
| -44.78 | 16.51 | 24.11 | 6.89 |
| -35.31 | -0.68 | 68.63 | -0.23 |
| 18.26 | -6.13 | 10.80 | -0.12 |
| 19.86 | 21.62 | -8.27 | 0.30 |
| -2.94 | 4.52 | 1.71 | 3.15 |
| -2.31 | -0.72 | -2.30 | 1.56 |
| 15.31 | -0.99 | -70.05 | -0.20 |
| 16.52 | -10.22 | -1.20 | -4.47 |
| 15.21 | -2.47 | 16.99 | 4.30 |
| -18.70 | 0.46 | 6.06 | -17.19 |
| 2.98 | -7.90 | -2.36 | 3.46 |
| 4.38 | 12.71 | 0.85 | 18.50 |
| 11.87 | 1.79 | 22.64 | 8.66 |
| -5.34 | 12.76 | -8.31 | -9.92 |
| -17.19 | -7.51 | -12.70 | -5.82 |
| -8.86 | 0.15 | -10.08 | 0.95 |
| 3.32 | 8.56 | -9.02 | 11.84 |
| -1.47 | -13.24 | 14.75 | -1.50 |
| -0.10 | 7.18 | -6.41 | -3.72 |
| -9.30 | 2.59 | 26.49 | 4.42 |
| -22.49 | 10.64 | | |

FIG. 5

Neural Network Inputs, Outputs and Output Error Values for GPS Receiver 1

| | Longitude | | | Latitude | | | 11 | 12 | 13 | 14 | 15 | 16 | 17 | 18 | 19 | O1 | O2 | dLon | dLat | Total |
|---|---|---|---|---|---|---|---|---|---|---|---|---|---|---|---|---|---|---|---|---|
| | Deg | Min | Sec | Deg | Min | Sec | | | | | | | | | | | | m | m | m |
| 1 | 103 | 56 | 31.6 | 374191.6 | 1 | 18 | 20.1 | 4700.1 | 7 | 4 | 1 | 9 | 1.6 | 4 | 7 | 0 | 0.1 | -0.0146 | 0.1002 | 1.1 | -0.2 | 1.1 |
| 2 | 103 | 56 | 31.8 | 374191.8 | 1 | 18 | 20.6 | 4700.6 | 7 | 4 | 1 | 9 | 1.8 | 4 | 7 | 0 | 0.6 | 0.0071 | 0.1512 | 0.5 | -0.5 | 0.8 |
| 3 | 103 | 56 | 31.5 | 374191.5 | 1 | 18 | 19.4 | 4699.4 | 7 | 4 | 1 | 9 | 1.5 | 4 | 6 | 9 | 9.4 | -0.0215 | 0.0290 | 0.1 | 0.1 | 0.2 |
| 4 | 103 | 56 | 32.3 | 374192.3 | 1 | 18 | 19.0 | 4699.0 | 7 | 4 | 1 | 9 | 2.3 | 4 | 6 | 9 | 9.0 | 0.0596 | -0.0114 | -0.2 | 0.1 | 0.3 |
| 5 | 103 | 56 | 32.4 | 374192.4 | 1 | 18 | 20.2 | 4700.2 | 7 | 4 | 1 | 9 | 2.4 | 4 | 7 | 0 | 0.2 | 0.0643 | 0.1103 | 1.4 | -0.3 | 1.4 |
| 6 | 103 | 49 | 56.3 | 373796.3 | 1 | 20 | 30.9 | 4830.9 | 7 | 3 | 7 | 9 | 6.3 | 4 | 8 | 3 | 0.9 | 0.1183 | 0.0053 | 0.4 | 0.4 | 0.6 |
| 7 | 103 | 49 | 56.8 | 373796.8 | 1 | 20 | 31.0 | 4831.0 | 7 | 3 | 7 | 9 | 6.8 | 4 | 8 | 3 | 1.0 | 0.1703 | 0.0150 | -0.2 | 0.4 | 0.5 |
| 8 | 103 | 49 | 54.4 | 373794.4 | 1 | 20 | 31.4 | 4831.4 | 7 | 3 | 7 | 9 | 4.4 | 4 | 8 | 3 | 1.4 | -0.0726 | 0.0557 | 0.7 | 0.2 | 0.7 |
| 9 | 103 | 49 | 55.9 | 373795.9 | 1 | 20 | 30.7 | 4830.7 | 7 | 3 | 7 | 9 | 5.9 | 4 | 8 | 3 | 0.7 | 0.0791 | -0.0153 | 0.2 | 0.6 | 0.6 |
| 10 | 103 | 40 | 51.2 | 373251.2 | 1 | 20 | 46.5 | 4846.5 | 7 | 3 | 2 | 5 | 1.2 | 4 | 8 | 4 | 6.5 | 0.0514 | 0.2111 | 2.6 | 0.4 | 2.6 |
| 11 | 103 | 40 | 50.6 | 373250.6 | 1 | 20 | 45.5 | 4845.5 | 7 | 3 | 2 | 5 | 0.6 | 4 | 8 | 4 | 5.5 | 0.0003 | 0.1129 | -0.1 | -0.1 | 0.2 |
| 12 | 103 | 40 | 50.7 | 373250.7 | 1 | 20 | 44.9 | 4844.9 | 7 | 3 | 2 | 5 | 0.7 | 4 | 8 | 4 | 4.9 | 0.0108 | 0.0520 | -0.3 | 0.2 | 0.3 |
| 13 | 103 | 40 | 50.1 | 373250.1 | 1 | 20 | 44.5 | 4844.5 | 7 | 3 | 2 | 5 | 0.1 | 4 | 8 | 4 | 4.5 | -0.0495 | 0.0112 | -0.2 | 0.4 | 0.4 |
| 14 | 103 | 40 | 50.7 | 373250.7 | 1 | 20 | 45.4 | 4845.4 | 7 | 3 | 2 | 5 | 0.7 | 4 | 8 | 4 | 5.4 | 0.0102 | 0.1031 | -0.1 | -0.2 | 0.2 |
| 15 | 103 | 40 | 50.6 | 373250.6 | 1 | 20 | 44.8 | 4844.8 | 7 | 3 | 2 | 5 | 0.6 | 4 | 8 | 4 | 4.8 | 0.0011 | 0.0415 | -0.3 | 0.3 | 0.4 |
| 16 | 103 | 40 | 49.8 | 373249.8 | 1 | 20 | 44.9 | 4844.9 | 7 | 3 | 2 | 4 | 9.8 | 4 | 8 | 4 | 4.9 | -0.0850 | 0.0502 | 1.5 | 0.7 | 1.6 |
| 17 | 103 | 40 | 50.2 | 373250.2 | 1 | 20 | 45.2 | 4845.2 | 7 | 3 | 2 | 5 | 0.2 | 4 | 8 | 4 | 5.2 | -0.0379 | 0.0818 | -0.6 | 0.2 | 0.7 |
| 18 | 103 | 56 | 31.9 | 374191.9 | 1 | 23 | 16.0 | 4996.0 | 7 | 4 | 1 | 9 | 1.9 | 4 | 9 | 6 | 6.0 | -0.0308 | 0.1258 | 0.0 | -0.1 | 0.1 |
| 19 | 103 | 56 | 31.9 | 374191.9 | 1 | 23 | 13.3 | 4993.3 | 7 | 4 | 1 | 9 | 1.9 | 4 | 9 | 3 | 3.3 | -0.0296 | -0.1419 | -0.4 | -0.7 | 0.8 |
| 20 | 103 | 56 | 32.4 | 374192.4 | 1 | 23 | 16.0 | 4996.0 | 7 | 4 | 1 | 9 | 2.4 | 4 | 9 | 6 | 6.0 | 0.0196 | 0.1251 | -0.1 | 0.2 | 0.2 |
| 21 | 103 | 56 | 32.4 | 374192.4 | 1 | 23 | 16.0 | 4996.0 | 7 | 4 | 1 | 9 | 2.4 | 4 | 9 | 6 | 6.0 | 0.0196 | 0.1251 | -0.1 | 0.2 | 0.2 |
| 22 | 103 | 56 | 32.4 | 374192.4 | 1 | 23 | 15.6 | 4995.6 | 7 | 4 | 1 | 9 | 2.4 | 4 | 9 | 5 | 5.6 | 0.0201 | 0.0859 | -0.3 | -0.1 | 0.3 |
| 23 | 103 | 52 | 38.5 | 373958.5 | 1 | 16 | 50.4 | 4610.4 | 7 | 3 | 9 | 5 | 8.5 | 4 | 6 | 1 | 0.4 | -0.1041 | -0.0542 | 0.8 | 1.4 | 1.6 |
| 24 | 103 | 50 | 20.3 | 373820.3 | 1 | 25 | 37.1 | 5137.1 | 7 | 3 | 8 | 2 | 0.3 | 5 | 1 | 3 | 7.1 | 0.0642 | 0.0502 | -0.3 | 0.0 | 0.3 |
| 25 | 103 | 50 | 19.6 | 373819.6 | 1 | 25 | 40.7 | 5140.7 | 7 | 3 | 8 | 1 | 9.6 | 5 | 1 | 4 | 0.7 | -0.0063 | 0.2680 | -0.2 | 42.6 | 42.6 |
| 26 | 103 | 50 | 19.5 | 373819.5 | 1 | 25 | 36.7 | 5136.7 | 7 | 3 | 8 | 1 | 9.5 | 5 | 1 | 3 | 6.7 | -0.0174 | 0.0100 | 0.2 | 0.1 | 0.2 |
| 27 | 103 | 50 | 20.1 | 373820.1 | 1 | 25 | 36.9 | 5136.9 | 7 | 3 | 8 | 2 | 0.1 | 5 | 1 | 3 | 6.9 | 0.0464 | 0.0304 | -1.0 | -0.1 | 1.0 |
| 28 | 103 | 50 | 19.4 | 373819.4 | 1 | 25 | 37.9 | 5137.9 | 7 | 3 | 8 | 1 | 9.4 | 5 | 1 | 3 | 7.9 | -0.0274 | 0.1321 | 0.2 | -0.6 | 0.6 |

FIG. 8

| Neural Network Inputs, Outputs and Output Error Values for GPS Receiver 2 | | | | | | | | | | | | | | | | | | | | | |
|---|---|---|---|---|---|---|---|---|---|---|---|---|---|---|---|---|---|---|---|---|---|
| | Longitude | | | Latitude | | | | | | | | | | | | O1 | O2 | dLon | dLat | Total | |
| No. | Deg | Min | Sec | Deg | Min | Sec | 11 | 12 | 13 | 14 | 15 | 16 | 17 | 18 | 19 | | | m | m | m | |
| 1 | 103 | 56 | 31.8 | 1 | 18 | 20.0 4700.0 | 7 | 4 | 1 | 9 | 1.8 | 4 | 7 | 0 | 0.0 | 0.0063 | 0.0893 | 0.8 | 0.0 | 0.8 |
| 2 | 103 | 56 | 33.7 | 1 | 18 | 16.7 4696.7 | 7 | 4 | 1 | 9 | 3.7 | 4 | 6 | 9 | 6.7 | 0.1992 | -0.2425 | -0.1 | 0.6 | 0.6 |
| 3 | 103 | 56 | 31.7 | 1 | 18 | 19.1 4699.1 | 7 | 4 | 1 | 9 | 1.7 | 4 | 6 | 9 | 9.1 | -0.0010 | -0.0013 | 0.0 | 0.2 | 0.2 |
| 4 | 103 | 56 | 29.7 | 1 | 18 | 18.6 4698.6 | 7 | 4 | 1 | 8 | 9.7 | 4 | 6 | 9 | 8.6 | -0.1871 | -0.0474 | -4.2 | -1.0 | 4.3 |
| 5 | 103 | 56 | 32.2 | 1 | 18 | 18.3 4698.3 | 7 | 4 | 1 | 9 | 2.2 | 4 | 6 | 9 | 8.3 | 0.0477 | -0.0801 | 0.4 | -0.2 | 0.4 |
| 6 | 103 | 49 | 54.3 | 1 | 20 | 31.1 4831.1 | 7 | 3 | 7 | 9 | 4.3 | 4 | 8 | 3 | 1.1 | -0.0827 | 0.0248 | 0.7 | 0.5 | 0.9 |
| 7 | 103 | 49 | 54.3 | 1 | 20 | 30.8 4830.8 | 7 | 3 | 7 | 9 | 4.3 | 4 | 8 | 3 | 0.8 | -0.0829 | -0.0062 | 0.8 | 0.8 | 1.1 |
| 8 | 103 | 49 | 56.3 | 1 | 20 | 30.8 4830.8 | 7 | 3 | 7 | 9 | 6.3 | 4 | 8 | 3 | 0.8 | 0.1185 | -0.0050 | 0.4 | 0.4 | 0.6 |
| 9 | 103 | 49 | 55.2 | 1 | 20 | 29.6 4829.6 | 7 | 3 | 7 | 9 | 5.2 | 4 | 8 | 2 | 9.6 | 0.0052 | -0.1202 | 1.4 | -1.0 | 1.7 |
| 10 | 103 | 40 | 53.6 | 1 | 20 | 44.1 4844.1 | 7 | 3 | 2 | 5 | 3.6 | 4 | 8 | 4 | 4.1 | 0.0781 | -0.0262 | 66.6 | -0.4 | 66.6 |
| 11 | 103 | 40 | 49.3 | 1 | 20 | 45.1 4845.1 | 7 | 3 | 2 | 4 | 9.3 | 4 | 8 | 4 | 5.1 | -0.1327 | 0.0702 | 0.8 | 0.7 | 1.0 |
| 12 | 103 | 40 | 50.4 | 1 | 20 | 45.4 4845.4 | 7 | 3 | 2 | 5 | 0.4 | 4 | 8 | 4 | 5.4 | -0.0186 | 0.1025 | -0.4 | 0.0 | 0.4 |
| 13 | 103 | 40 | 50.4 | 1 | 20 | 43.6 4843.6 | 7 | 3 | 2 | 5 | 0.4 | 4 | 8 | 4 | 3.6 | -0.0207 | -0.0750 | 0.2 | -0.8 | 0.8 |
| 14 | 103 | 40 | 51.3 | 1 | 20 | 44.4 4844.4 | 7 | 3 | 2 | 5 | 1.3 | 4 | 8 | 4 | 4.4 | 0.0703 | 0.0024 | -0.1 | 0.0 | 0.1 |
| 15 | 103 | 40 | 50.7 | 1 | 20 | 42.6 4842.6 | 7 | 3 | 2 | 5 | 0.7 | 4 | 8 | 4 | 2.6 | 0.0133 | -0.1784 | -1.0 | 0.3 | 1.0 |
| 16 | 103 | 40 | 52.5 | 1 | 20 | 44.1 4844.1 | 7 | 3 | 2 | 5 | 2.5 | 4 | 8 | 4 | 4.1 | 0.1923 | -0.0274 | -0.7 | 0.0 | 0.7 |
| 17 | 103 | 40 | 50.3 | 1 | 20 | 44.5 4844.5 | 7 | 3 | 2 | 5 | 0.3 | 4 | 8 | 4 | 4.5 | -0.0291 | 0.0113 | -0.3 | 0.4 | 0.5 |
| 18 | 103 | 56 | 33.7 | 1 | 23 | 15.6 4995.6 | 7 | 4 | 1 | 9 | 3.7 | 4 | 9 | 5 | 5.6 | 0.1486 | 0.0857 | 0.2 | 0.0 | 0.2 |
| 19 | 103 | 56 | 32.6 | 1 | 23 | 12.0 4992.0 | 7 | 4 | 1 | 9 | 2.6 | 4 | 9 | 2 | 0 | 0.0378 | -0.2739 | 0.4 | -0.2 | 0.4 |
| 20 | 103 | 56 | 27.9 | 1 | 23 | 11.5 4991.5 | 7 | 3 | 8 | 8 | 7.9 | 4 | 9 | 1 | 5 | -0.4337 | -0.3250 | 0.9 | 0.2 | 0.9 |
| 21 | 103 | 56 | 31.6 | 1 | 23 | 18.3 4998.3 | 7 | 3 | 8 | 9 | 1.6 | 4 | 9 | 9 | 8.3 | -0.0681 | 0.3528 | 2.2 | 0.8 | 2.3 |
| 22 | 103 | 56 | 31.9 | 1 | 23 | 14.8 4994.8 | 7 | 3 | 8 | 9 | 1.9 | 4 | 9 | 4 | 4.8 | -0.0321 | 0.0067 | 0.4 | -0.3 | 0.5 |
| 23 | 103 | 52 | 37.1 | 1 | 16 | 51.7 4611.7 | 7 | 3 | 9 | 5 | 7.1 | 4 | 6 | 1 | 1.7 | -0.1790 | 0.0811 | -18.7 | -0.2 | 18.7 |
| 24 | 103 | 50 | 21.2 | 1 | 25 | 35.2 5135.2 | 7 | 3 | 8 | 2 | 1.2 | 5 | 1 | 3 | 5.2 | 0.1550 | -0.1407 | -0.6 | 0.3 | 0.6 |
| 25 | 103 | 50 | 19.2 | 1 | 25 | 37.7 5137.7 | 7 | 3 | 8 | 1 | 9.2 | 5 | 1 | 3 | 7.7 | -0.0478 | 0.1116 | 0.3 | -0.4 | 0.5 |
| 26 | 103 | 50 | 18.4 | 1 | 25 | 32.1 5132.1 | 7 | 3 | 8 | 1 | 8.4 | 5 | 1 | 3 | 2.1 | -0.1921 | -0.2890 | 19.6 | -48.2 | 52.1 |
| 27 | 103 | 50 | 20.5 | 1 | 25 | 33.3 5133.3 | 7 | 3 | 8 | 2 | 0.5 | 5 | 1 | 3 | 3.3 | 0.0949 | -0.3196 | -3.5 | -3.1 | 4.7 |
| 28 | 103 | 50 | 19.0 | 1 | 25 | 36.5 5136.5 | 7 | 3 | 8 | 1 | 9.0 | 5 | 1 | 3 | 6.5 | -0.0679 | -0.0095 | 0.3 | -0.1 | 0.3 |

FIG. 9

| | Truth Coordinates of Test Points in Figs. 8 and 9 | | | | | |
|---|---|---|---|---|---|---|
| | LONGITUDE | | | LATITUDE | | |
| | Deg | Min | Sec | Deg | Min | Sec |
| 1 | 103 | 56 | 31.711 | 1 | 18 | 19.106 |
| 2 | 103 | 56 | 31.711 | 1 | 18 | 19.106 |
| 3 | 103 | 56 | 31.711 | 1 | 18 | 19.106 |
| 4 | 103 | 56 | 31.711 | 1 | 18 | 19.106 |
| 5 | 103 | 56 | 31.711 | 1 | 18 | 19.106 |
| 6 | 103 | 49 | 55.103 | 1 | 20 | 30.835 |
| 7 | 103 | 49 | 55.103 | 1 | 20 | 30.835 |
| 8 | 103 | 49 | 55.103 | 1 | 20 | 30.835 |
| 9 | 103 | 49 | 55.103 | 1 | 20 | 30.835 |
| 10 | 103 | 40 | 50.601 | 1 | 20 | 44.375 |
| 11 | 103 | 40 | 50.601 | 1 | 20 | 44.375 |
| 12 | 103 | 40 | 50.601 | 1 | 20 | 44.375 |
| 13 | 103 | 40 | 50.601 | 1 | 20 | 44.375 |
| 14 | 103 | 40 | 50.601 | 1 | 20 | 44.375 |
| 15 | 103 | 40 | 50.601 | 1 | 20 | 44.375 |
| 16 | 103 | 40 | 50.601 | 1 | 20 | 44.375 |
| 17 | 103 | 40 | 50.601 | 1 | 20 | 44.375 |
| 18 | 103 | 56 | 32.208 | 1 | 23 | 14.744 |
| 19 | 103 | 56 | 32.208 | 1 | 23 | 14.744 |
| 20 | 103 | 56 | 32.208 | 1 | 23 | 14.744 |
| 21 | 103 | 56 | 32.208 | 1 | 23 | 14.744 |
| 22 | 103 | 56 | 32.208 | 1 | 23 | 14.744 |
| 23 | 103 | 52 | 39.153 | 1 | 16 | 50.895 |
| 24 | 103 | 50 | 19.669 | 1 | 25 | 36.598 |
| 25 | 103 | 50 | 19.669 | 1 | 25 | 36.598 |
| 26 | 103 | 50 | 19.669 | 1 | 25 | 36.598 |
| 27 | 103 | 50 | 19.669 | 1 | 25 | 36.598 |
| 28 | 103 | 50 | 19.669 | 1 | 25 | 36.598 |

FIG. 10

| \multicolumn{6}{|c|}{Uncorrected Observation Data and Error Values from GPS Receiver 1} |
|---|---|---|---|---|---|
| No. | Latitude (Degrees) | Longitude (Degrees) | dLon(m) | dLat(m) | Total (m) |
| 1 | 1:18 20.0 | 103:56 31.8 | 2.67 | 26.82 | 26.95 |
| 2 | 1:18 16.7 | 103:56 33.7 | 59.67 | -72.18 | 93.66 |
| 3 | 1:18 19.1 | 103:56 31.7 | -0.33 | -0.18 | 0.38 |
| 4 | 1:18 18.6 | 103:56 29.7 | -60.33 | -15.18 | 62.21 |
| 5 | 1:18 18.3 | 103:56 32.2 | 14.67 | -24.18 | 28.29 |
| 6 | 1:20 31.1 | 103:49 54.3 | -24.09 | 7.95 | 25.37 |
| 7 | 1:20 30.8 | 103:49 54.3 | -24.09 | -1.05 | 24.11 |
| 8 | 1:20 30.8 | 103:49 56.3 | 35.91 | -1.05 | 35.93 |
| 9 | 1:20 29.6 | 103:49 55.2 | 2.91 | -37.05 | 37.16 |
| 10 | 1:20 44.1 | 103:40 53.6 | 89.98 | -8.26 | 90.36 |
| 11 | 1:20 45.1 | 103:40 49.3 | -39.02 | 21.74 | 44.67 |
| 12 | 1:20 45.4 | 103:40 50.4 | -6.02 | 30.74 | 31.33 |
| 13 | 1:20 43.6 | 103:40 50.4 | -6.02 | -23.26 | 24.02 |
| 14 | 1:20 44.4 | 103:40 51.3 | 20.98 | 0.74 | 21.00 |
| 15 | 1:20 42.6 | 103:40 50.7 | 2.98 | -53.26 | 53.34 |
| 16 | 1:20 44.1 | 103:40 52.5 | 56.98 | -8.26 | 57.58 |
| 17 | 1:20 44.5 | 103:40 50.3 | -9.02 | 3.74 | 9.76 |
| 18 | 1:23 15.6 | 103:56 33.7 | 44.75 | 25.68 | 51.59 |
| 19 | 1:23 12.0 | 103:56 32.6 | 11.75 | -82.32 | 83.16 |
| 20 | 1:23 11.5 | 103:56 27.9 | -129.25 | -97.32 | 161.79 |
| 21 | 1:23 18.3 | 103:56 31.6 | -18.25 | 106.68 | 108.23 |
| 22 | 1:23 14.8 | 103:56 31.9 | -9.25 | 1.68 | 9.40 |
| 23 | 1:16 51.7 | 103:52 37.1 | -72.39 | 24.15 | 76.31 |
| 24 | 1:25 35.2 | 103:50 21.2 | 45.94 | -41.95 | 62.21 |
| 25 | 1:25 37.7 | 103:50 19.2 | -14.06 | 33.05 | 35.92 |
| 26 | 1:25 32.1 | 103:50 18.4 | -38.06 | -134.95 | 140.21 |
| 27 | 1:25 33.3 | 103:50 20.5 | 24.94 | -98.95 | 102.04 |
| 28 | 1:25 36.5 | 103:50 19.0 | -20.06 | -2.95 | 20.28 |

FIG. 11

| Uncorrected Observation Data and Error Values from GPS Receiver 2 | | | | | |
|---|---|---|---|---|---|
| No. | Latitude (N) (deg/min/sec) | Longitude (E) (deg/min/sec) | dLat(m) | dLon(m) | Total (m) |
| 1 | 1:18 20.1 | 103:56 31.6 | -3.33 | 29.82 | 30.00 |
| 2 | 1:18 20.6 | 103:56 31.8 | 2.67 | 44.82 | 44.90 |
| 3 | 1:18 19.4 | 103:56 31.5 | -6.33 | 8.82 | 10.85 |
| 4 | 1:18 19.0 | 103:56 32.3 | 17.67 | -3.18 | 17.96 |
| 5 | 1:18 20.2 | 103:56 32.4 | 20.67 | 32.82 | 38.78 |
| 6 | 1:20 30.9 | 103:49 56.3 | 35.91 | 1.95 | 35.96 |
| 7 | 1:20 31.0 | 103:49 56.8 | 50.91 | 4.95 | 51.15 |
| 8 | 1:20 31.4 | 103:49 54.4 | -21.09 | 16.95 | 27.06 |
| 9 | 1:20 30.7 | 103:49 55.9 | 23.91 | -4.05 | 24.25 |
| 10 | 1:20 46.5 | 103:40 51.2 | 17.98 | 63.74 | 66.23 |
| 11 | 1:20 45.5 | 103:40 50.6 | -0.02 | 33.74 | 33.74 |
| 12 | 1:20 44.9 | 103:40 50.7 | 2.98 | 15.74 | 16.02 |
| 13 | 1:20 44.5 | 103:40 50.1 | -15.02 | 3.74 | 15.48 |
| 14 | 1:20 45.4 | 103:40 50.7 | 2.98 | 30.74 | 30.89 |
| 15 | 1:20 44.8 | 103:40 50.6 | -0.02 | 12.74 | 12.74 |
| 16 | 1:20 44.9 | 103:40 49.8 | -24.02 | 15.74 | 28.72 |
| 17 | 1:20 45.2 | 103:40 50.2 | -12.02 | 24.74 | 27.51 |
| 18 | 1:23 16.0 | 103:56 31.9 | -9.25 | 37.68 | 38.80 |
| 19 | 1:23 13.3 | 103:56 31.9 | -9.25 | -43.32 | 44.30 |
| 20 | 1:23 16.0 | 103:56 32.4 | 5.75 | 37.68 | 38.11 |
| 21 | 1:23 16.0 | 103:56 32.4 | 5.75 | 37.68 | 38.11 |
| 22 | 1:23 15.6 | 103:56 32.4 | 5.75 | 25.68 | 26.31 |
| 23 | 1:16 50.4 | 103:52 38.5 | -30.39 | -14.85 | 33.82 |
| 24 | 1:25 37.1 | 103:50 20.3 | 18.94 | 15.05 | 24.19 |
| 25 | 1:25 40.7 | 103:50 19.6 | -2.06 | 123.05 | 123.07 |
| 26 | 1:25 36.7 | 103:50 19.5 | -5.06 | 3.05 | 5.91 |
| 27 | 1:25 36.9 | 103:50 20.1 | 12.94 | 9.05 | 15.79 |
| 28 | 1:25 37.9 | 103:50 19.4 | -8.06 | 39.05 | 39.88 |

FIG. 12

SYSTEM FOR IMPROVING AVERAGE ACCURACY OF SIGNALS FROM GLOBAL POSITIONING SYSTEM BY USING A NEURAL NETWORK TO OBTAIN SIGNAL CORRECTION VALUES

BACKGROUND OF THE INVENTION

The Global Positioning System (GPS) is a satellite-based, three-dimensional worldwide positioning or navigation system. Two signal codes are used by the GPS, a Precision (P) code transmitted at 10.23 MHz., and a Clear-Access (C/A) code transmitted at 1.023 MHz. Both the P and C/A code signals carry the same information with a data bit frequency of 50 bits/second. The P code signals are used in military applications and provide more accurate coordinate data than the C/A code signals. The signal transmitted by each satellite contains a navigation message which includes time information, data for clock correction, space vehicle status data, synchronization information, ephemeris of the satellite, corrections for delay in signal propagation, and special messages.

The basic GPS provides positioning accuracies of 100 meters for receivers that use the C/A code, and 20 meters or better for receivers that use the P code. P code signals are encrypted and thus cannot be received by commercial GPS receivers. Only authorized users are provided with the ability to use the P code signals. Intentional errors are added to the C/A code signals to reduce signal accuracy. The accuracies of both the P code and C/A code receivers have been improved by the development of a Differential GPS (DGPS). The DGPS requires the establishment of auxiliary base stations at regular distances on the surface of the Earth. These base stations are located at presurveyed points having coordinates that are known to a high precision. These presurveyed coordinates are generally termed as the Truth Coordinates of the base point.

In the DGPS, a GPS receiver is used at each base station to receive GPS satellite signals and estimate the GPS determined coordinates of the base point. These computed coordinates are compared with the Truth Coordinates of the base point and the actual errors associated with GPS measurements are obtained by taking the difference of these values. These errors are then formatted and broadcast from an antenna set up at the base station. The transmission of these errors (generally known as "DGPS corrections") must occur in real time on a continual basis 24 hours a day to be of use to DGPS receivers. Other users of the GPS in close proximity of the base station (e.g., 200–300 kilometers) can acquire the broadcast errors of the GPS and use them to improve the performance of their own GPS receivers.

FIG. 1 shows a prior art DGPS system 100 for processing GPS signals, as described above. The system 100 includes a GPS receiver 102, a base station correction signal receiver 104, and a processor 106. The GPS receiver 102 receives position coordinate signals from an array of orbiting satellites 108. The base station correction signal receiver 104 receives a signal from one of a plurality of auxiliary base stations $110_1, 110_2, \ldots 110_n$. The processor 106 receives the output of the receivers 102 and 104, and outputs improved GPS data.

The basic DGPS has been further augmented as the Wide Area DGPS (WADGPS). The WADGPS uses refined algorithms to estimate GPS errors and broadcasts them via a set of satellites. The implementation of the WADGPS has extended the use of base station data to more than 1,000 kilometers. The WADGPS is currently being implemented and will require the establishment and support of several hundred base stations throughout the world and the availability of additional (non-GPS) satellites. The WADGPS will require a large infrastructure and significant financial and operational resources. For some regions of the world, the costs and resources can be prohibitive.

Practical implementation of a conventional DGPS may broadcast GPS errors in terms of component errors such as range errors (generally termed as pseudorange errors) for all visible satellites, the ionospheric delays, tropospheric delays, and the like, established at the base stations.

One drawback to the DGPS is that DGPS corrections must be continuously transmitted in real time and processed by GPS receivers. Furthermore, the transmissions are prone to interference and intentional jamming. When GPS receivers are used in military applications or even certain commercial applications, interference and/or jamming will cause considerable problems. It would thus be desirable to implement the DGPS without the need to transmit or process real time DGPS corrections.

The application of DGPS to P-code (military use) receivers allows coordinate errors to be reduced to one meter or less. However, civilian (commercial) users are limited to the less accurate C/A code. Furthermore, errors are intentionally added to the C/A code. The DGPS improves performance of C/A code receivers, but final accuracy is not as good as for the P code receivers.

A new approach to DGPS system development has been under investigation since 1993. This approach eliminates the need for real time transmission of DGPS corrections, but would be valid for a relatively small geographical region. Some experiments were conducted to determine the feasibility of using constant corrections to coordinate data instead of the real time DGPS corrections. However, performance of such an approach was sensitive to the brands of commercial (C/A code) GPS receivers used in the experiments. There was significant improvement in coordinate accuracy for some types of GPS receivers, but others showed no discernible improvement. The errors, however, were still in the range of 20 to 40 meters.

Accordingly, there is still a need for an autonomous DGPS system which can provide more accurate corrections to GPS coordinate data without relying upon real time DGPS corrections, which can perform equally well for different brands of GPS receivers, and which can be implemented in an inexpensive manner by GPS receivers that process C/A code or P-code signals. The present invention fills this need and provides a system which reduces average errors of basic GPS systems to below ten (10) meters in commercial GPS receivers.

BRIEF SUMMARY OF THE INVENTION

The present invention provides an apparatus adapted to improve the accuracy of signals associated with a global positioning system (GPS). The apparatus includes a data conditioner, an artificial neural network, and an output processor. The data conditioner receives uncorrected, measured coordinate data from a GPS receiver, processes the coordinate data, and outputs a plurality of discrete values which are directly related to the coordinate data. The neural network comprises an input layer having a plurality of inputs. Each input receives one of the plurality of discrete values. The neural network also includes processing nodes, neurons and weights for mathematically manipulating the inputted values. The neural network also includes an output layer for outputting coordinate data correction values. The output processor receives the coordinate data correction values and the uncorrected, measured coordinate data, mathematically manipulates the coordinate data correction values and the uncorrected, measured coordinate data, and outputs corrected coordinate data.

Another embodiment of the present invention provides a GPS receiver which performs the functions described immediately above.

Yet another embodiment of the present invention is a method for correcting raw, measured coordinate data associated with a global positioning system (GPS) by processing the raw, measured coordinate data through a neural network.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIGS. 4(a) and 4(b), taken together, is a weight matrix V for use in the neural network of FIG. 3;

FIG. 5 is a weight matrix W for use in the neural network of FIG. 3;

FIG. 8 shows tables of inputs and outputs for the neural network of FIG. 3 which receives data from a GPS receiver of FIG. 2;

FIG. 9 shows tables of inputs and outputs for a neural network of FIG. 3 which receives data from another GPS receiver of FIG. 2;

FIG. 10 shows a table of Truth Coordinates of Test Points in FIGS. 8 and 9;

FIG. 11 shows tables of observed coordinate data collected using a conventional GPS receiver;

FIG. 12 shows tables of observed coordinate data collected using another conventional GPS receiver;

DETAILED DESCRIPTION OF THE INVENTION

Figure 1:
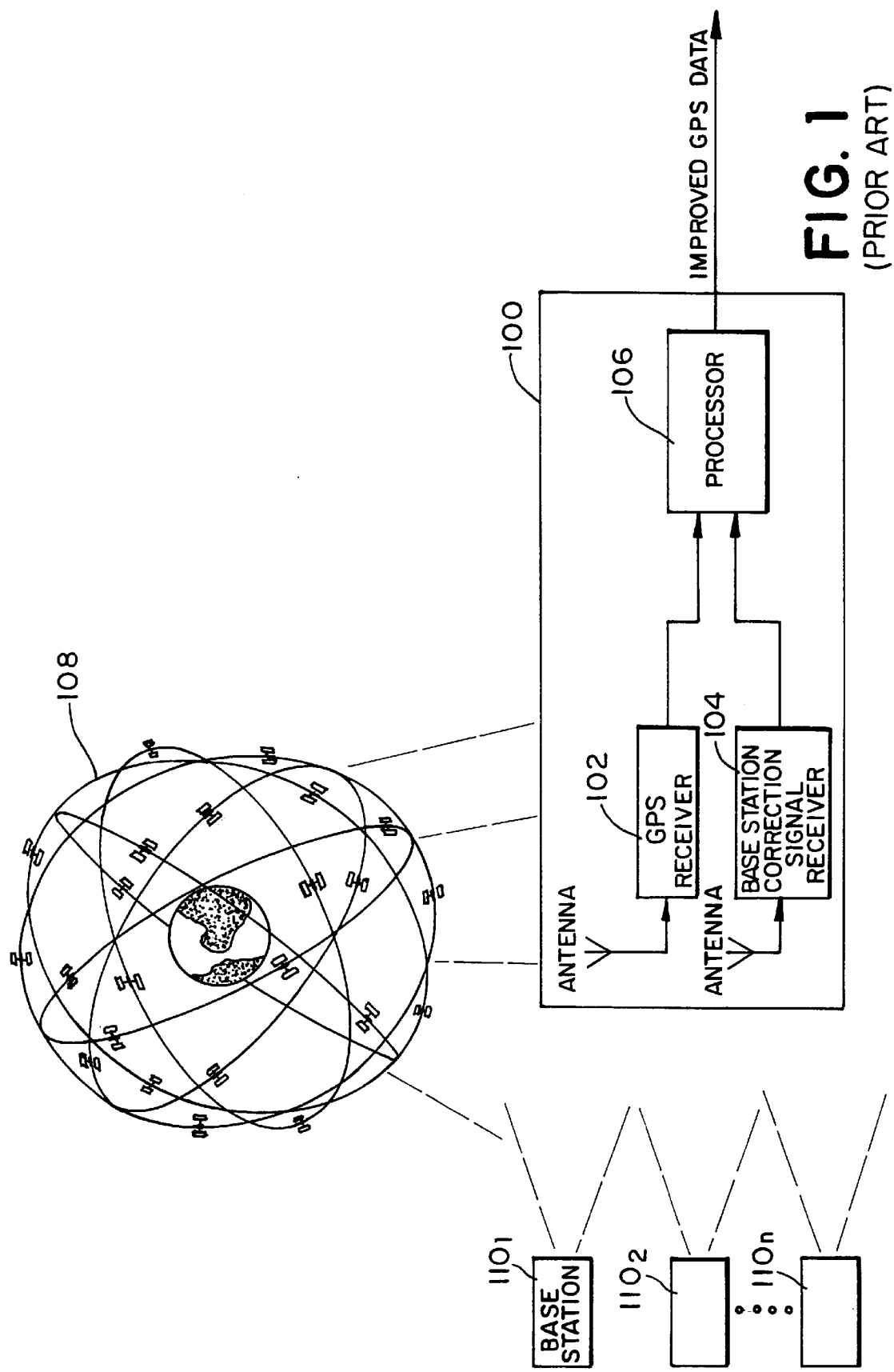
FIG. 1 is a schematic block diagram of a system for processing GPS signals in accordance with the prior art.

Certain terminology is used herein for convenience only and is not to be taken as a limitation on the present invention.

In the drawings, the same reference numerals are employed for designating the same elements throughout the several figures.

OVERVIEW OF PRESENT INVENTION

Figure 2:
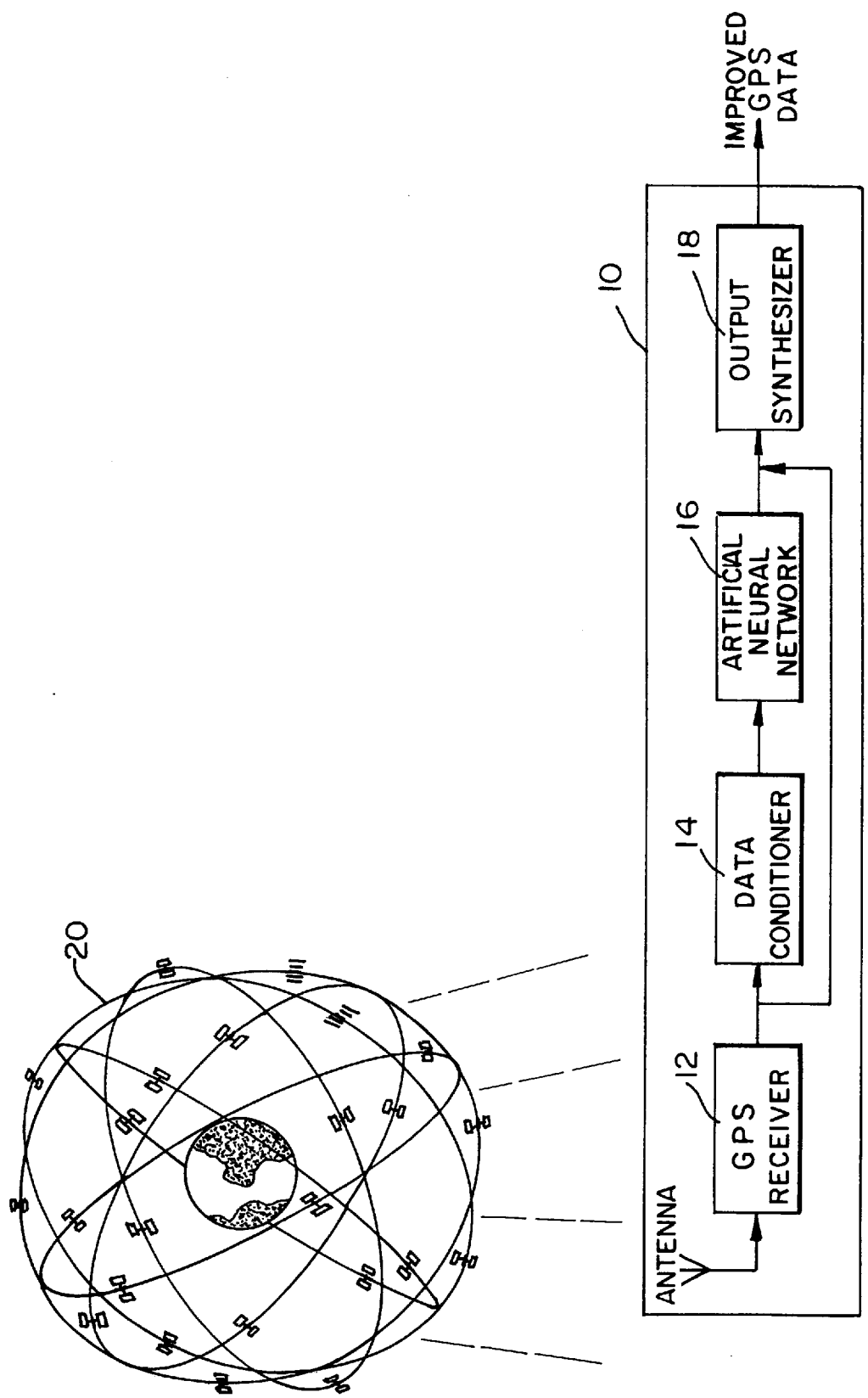
FIG. 2 is a schematic block diagram of a system for processing GPS signals in accordance with a preferred embodiment of the present invention.

FIG. 2 shows a schematic block diagram of a system 10 for obtaining improved GPS data, in accordance with a preferred embodiment of the present invention. The system 10 includes a GPS receiver 12, a data conditioner 14, an artificial neural network 16 and an output processor or output synthesizer 18. The GPS receiver 12 receives position coordinate signals from an array of orbiting satellites 20. The system 10 does not receive any signals from base stations (not shown). The orbiting satellites 20 are part of a conventional GPS network. The GPS receiver 12 outputs raw (i.e., uncorrected) position coordinate data. GPS receivers for performing such functions are conventional, and are thus not described in further detail herein. The GPS receiver 12 processes signals from the satellites 20. Even if there are base stations in the vicinity, the GPS receiver 12 does not process or use the real time differential GPS corrections transmitted from the base stations. Instead, the remaining elements of the system 10 perform signal correction. Specifically, the raw, uncorrected coordinate data output from the GPS receiver 12 is conditioned by the data conditioner 14. The output of the data conditioner 14 is fed into the input of the neural network 16 to obtain signal corrections. The outputted signal corrections and the raw, uncorrected coordinate data are input into the output synthesizer 18 to obtain improved GPS coordinate data.

The embodiment of the invention described hereafter calculates two-dimensional position coordinates, particularly, latitude and longitude, according to the principle of differential GPS (DGPS). However, the scope of the invention includes systems and methods for calculating position coordinates in three dimensions. The system 10 of the present invention estimates GPS errors in a small region of 30 km (E-W) by 15 km (N-S). The system 10 can be extended to larger areas by dividing the Earth's surface into a network of grids, as described below with respect to FIGS. 13 and 14.

The phrase "differential GPS", as used herein, refers to the technique of subtracting correction values from raw GPS coordinates.

FIG. 2 shows an embodiment of the invention wherein the data conditioner 14, neural network 16, and output synthesizer 18 are external to the GPS receiver 12. However, these external elements may be built into the GPS receiver 12, especially in a commercialized version of the present invention. In such a configuration, a receiver circuit receives GPS signals from satellites, processes them to obtain uncorrected, measured coordinate data (e.g., latitude and longitude). The coordinate data corrections are then obtained using the data conditioner 14, neural network 16, and output synthesizer 18, as described above.

Figure 3:
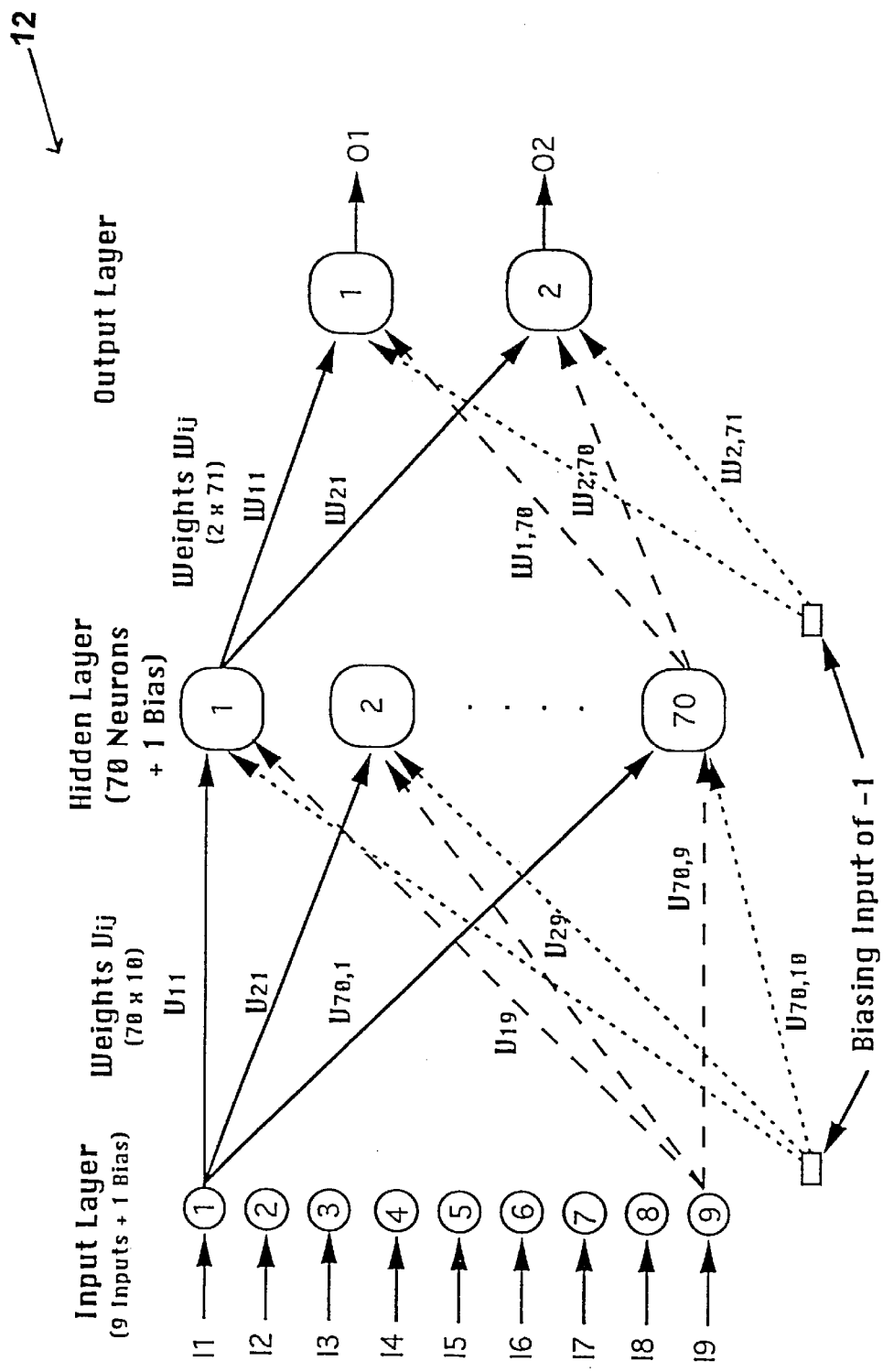
FIG. 3 is a model of a neural network for use in the system of FIG. 2.

FIG. 3 shows a model of a preferred embodiment of the neural network 16. The neural network 16 is a three layer feedforward artificial neural network. The neural network 16 has an input layer of nine values (data nodes) and a bias (offset node), a hidden layer of 70 neurons and a bias (offset node), an output layer of two neurons, a weight matrix V consisting of a set of weights $V_{ij}$ between the input layer and the hidden layer, and a weight matrix W consisting of a set of weights $W_{ij}$ between the hidden layer and the output layer. The input values are specially formatted and conditioned GPS measurements. The output values correspond to the GPS errors or signal corrections estimated by the system of the present invention. The output values are also specially formatted and conditioned. The formatting and conditioning of the input and output values is described in detail below. The errors are applied to the raw, uncorrected measured latitude and longitude coordinates to obtain latitude and longitude coordinates with improved accuracy. The hidden layer and the output layer use a biasing input of −1. The purpose of the biasing input is to provide proper scaling for the data processed by the neural network 16. The weight matrices V and W are established during the training phase of the neural network 12, described below with respect to FIG. 15.

The neural network 16 may be implemented in specially designed customized hardware or in a general purpose computer. Custom hardware should provide better response time, but will likely be more expensive than a general purpose computer.

FIGS. 4(a) and 4(b), taken together, show a sample table of values for weight matrix V in FIG. 3. FIG. 5 shows a sample table of values for weight matrix W in FIG. 3. In the disclosed embodiment of the invention, the weight matrix V is a 70×10 matrix and the weight matrix W is a 2×71 matrix. However, the scope of the invention includes weight matrices of other sizes. The size of the weight matrices will depend upon the actual number of inputs, outputs and the number of neurons in the hidden layer.

Figure 6:
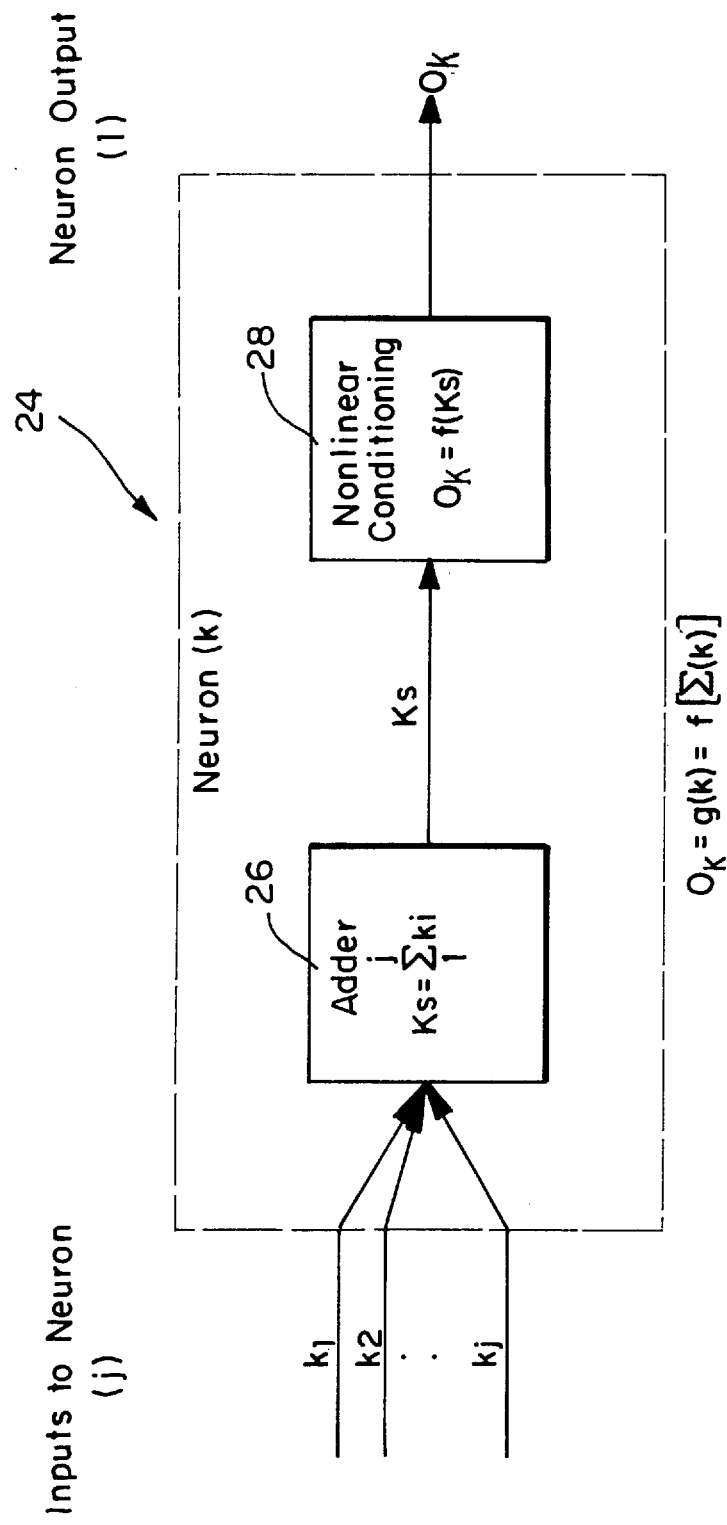
FIG. 6 is a schematic block diagram of the processing functions that occur within neurons associated with the neural network of FIG. 3.

FIG. 6 shows a schematic block diagram of the processing functions that occur within each neuron 24 of the hidden layer and the output layer. Specifically, each neuron used in the hidden layer and the output layer is a nonlinear processing entity. The inputs to the neuron 24 are arithmetically added by adder 26 to obtain an output $K_s$ of the neuron. The output $K_s$ is passed through a nonlinear conditioning circuit 28 for performing a nonlinear function $f(K_s)$ to obtain an output $O_k$. This nonlinear operation is known as the "activation function" of the neuron. The nonlinear function $f(K_s)$ used in the disclosed neural network 16 is a function commonly known as the bipolar sigmoidal function represented as:

$$f(\chi) = \frac{2}{1+e^{-\lambda x}} - 1 = \frac{1-e^{-\lambda \chi}}{1+e^{-\lambda \chi}}$$

where $\lambda > 0$.

Figure 7:
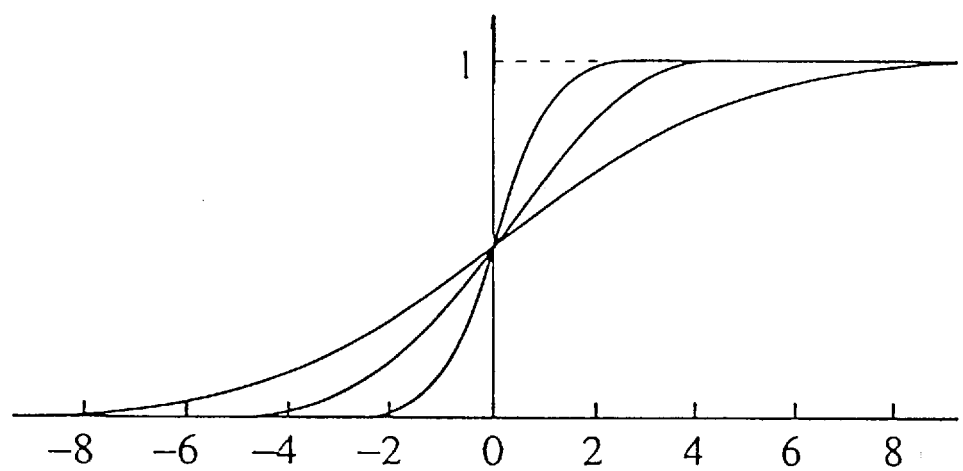
FIG. 7 is a graph of a bipolar sigmoidal function for use with the neurons of FIG. 6.

FIG. 7 shows a graph of the bipolar sigmoidal function. The function values computed from the above equation approach a step function for large values of the slope parameter $\lambda$. Generally, the value of $\lambda$ is selected by trial and error, and will depend upon the application and complexity. A slope parameter of 0.01 was used in the present example.

The composite processing of a neuron 24 consisting of the adder 26 followed by the activation function is represented by the nonlinear function g(.) such that, $$o_k = g(k)$$
$$= f[\Sigma(k)]$$

where k is the vector of inputs to neuron k and $O_k$ is the output of the same neuron.

The inputs to the neuron represent either the input quantities to the neural network 16 itself or the outputs of the neurons from other layers. Each of the inputs is multiplied by a weighting factor. The values of the various weights associated with the neurons are adjusted during the training of the neural network 16. Thus, the training of a neural network is the process of finalizing the values of the weights to match its input and output within a selected tolerance level.

The system 10 performs well because the neural network 16 can be considered as a highly nonlinear model of the DGPS technique. An important feature of the nonlinear model is the sigmoidal activation function. However, it is possible to use a different activation function, such as a threshold function, piecewise linear function, or the like. cl FORMATTING AND CONDITIONING OF INPUT VALUES FOR NEURAL NETWORK Referring to FIGS. 2 and 3, the data conditioner 14 receives the raw, uncorrected coordinate data (latitude and longitude) from the GPS receiver 12 and conditions and formats the data for inputting into the neural network 16. Specifically, the GPS receiver 12 measures Longitude and Latitude of a point on or near the surface of Earth as Degrees, Minutes and Seconds. These values are first converted to arc seconds in a decimal format with one decimal digit. The following specific assignments of the longitude and latitude values to the inputs of the neural network 16 are made:

(a) The full range of longitude values (to cover all the points on or near the surface of the Earth) require a total of six significant digits to the left of the decimal point. The most significant digit of all points within a region of 30 km (E-W) by 15 km (N-S) is, however, identical. Therefore, the remaining five significant digits along with the decimal fraction are used as the first five inputs (I1–I5) of the neural network 16 as shown in FIG. 3. These five inputs are defined as follows:

I1= Second most significant digit (ten thousands of arc seconds) of longitude value in arc seconds (representing a range of arc seconds 00000 to 90000).

I2= Third most significant digit (thousands of arc seconds) of longitude value in arc seconds (representing a range of arc seconds 0000 to 9000).

I3= Fourth most significant digit (hundreds of arc seconds) of longitude value in arc seconds (representing a range of arc seconds 000 to 900).

I4= Fifth most significant digit (tens of arc seconds) of longitude value in arc seconds (representing a range of arc seconds 00 to 90).

I5= Least significant digit (units of arc seconds) with one significant digit of the decimal part of longitude value in arc seconds (representing a range of arc seconds 0.0 to 9.9).

(b) The last four inputs, I6–I9, of the neural network 16 represent latitude values of the GPS measurements. The complete range of latitude values requires six significant digits to the left of the decimal point. The two most significant digits of all the points within a region of 30 km (E-W) by 15 km (N-S) are, however, identical. Thus, the remaining four digits to the left of the decimal point along with one decimal digit are utilized as the last four input values (I6–I9) of the neural network 16. Detailed definitions of the four inputs are as follows:

I6= Third most significant digit (thousands of arc seconds) of latitude value in arc seconds (representing a range of arc seconds 0000 to 9000).

I7= Fourth most significant digit (hundreds of arc seconds) of latitude value in arc seconds (representing a range of arc seconds 000 to 900).

I8= Fifth most significant digit (tens of arc seconds) of latitude value in arc seconds (representing a range of arc seconds 00 to 90).

I9= Least significant digit (units of arc seconds) with one significant digit of the decimal part of latitude value in arc seconds (representing a range of arc seconds 0.0 to 9.9).

FIG. 8 shows tables of inputs and outputs for a neural network 16 which receives data from a first GPS receiver. FIG. 9 shows tables of inputs and outputs for a neural network 16 which receives data from a second GPS receiver. Each of the 28 sets of inputs and outputs is associated with a location within a predefined region of 30 km (E-W) by 15 km (N-S). As described above, the first five inputs, I1–I5, are the five least significant digits of the actual longitude measurement in arc seconds, wherein the input I5 also includes one significant digit in fractions of an arc second. The last four inputs, I6–I9, are the four least significant digits of the actual latitude measurement in arc seconds, wherein the input I9 includes one significant digit in fractions of an arc second.

FORMATTING AND CONDITIONING OF DATA OUTPUT FROM NEURAL NETWORK

The formatting and conditioning of output data O1 and O2 from the neural network 16 is determined during training of the neural network 16. The output data O1 and O2 is described as follows:

O1= The scaled down (after dividing by 300) longitude error in meters and has a range of values between +1.0000 and −1.0000.

O2- The scaled down (after dividing by 300) latitude error in meters and has a range of values between +1.0000 and −1.0000.

To obtain the actual error values in meters, the outputs O1 and O2 are multiplied by 300 as follows:

Δlongitude=300 * O1 meters.

Δlatitude=300 * O2 meters.

The corrected GPS coordinates (same as DGPS coordinates) are obtained by subtracting the error values from the measurements as follows:

(Longitude)$_{dgps}$= GPS measured longitude −Δlongitude, (Latitude)$_{dgps}$= GPS measured latitude −Δlatitude.

Referring again to FIGS. 8 and 9, the last three columns show dLon, dLat and Total error, in meters.

dLon=(Longitude)$_{dgps}$ −(Longitude)$_{true}$ dLat=(Latitude)$_{dgps}$ −(Latitude)$_{true}$ where true values are the truth coordinates of the point. To carry out the calculations in consistent units, a conversion factor (c) from meters to arc seconds is needed. The conversion factor (c) =30 meters/arc second. Sample calculations for the data from the first line of FIG. 8 are provided below. Data for other lines are computed in the same manner.

(Longitude)$_{gps}$ = 103 deg 56 min 31.6 sec (Longitude)$_{true}$ = 103 deg 56 min 31.711 sec (Latitude)$_{gps}$ = 1 deg 18 min 20.1 sec (Latitude)$_{true}$ = 1 deg 18 min 19.106 sec From FIG. 8, Line 1: O1 = −0.0146, O2 = 0.1002, and dLon = +1.1 meters, dLat = −0.2 meters and Total Error = 1.1 meters Δlongitude = O1 * 300 = −4.38 meters = −0.146 arc seconds Δlatitude = O2 * 300 = +30.06 meters = +1.002 arc seconds (Longitude)$_{dgps}$ = (Longitude)$_{gps}$ − Δlongitude = 103 deg 56 min 31.6 sec − (−0.146 sec) = 103 deg 56 min 31.746 sec (Latitude)$_{dgps}$ = (Latitude)$_{gps}$ − Δlatitude = 1 deg 18 min 20.1 sec − (1.002 sec) = 1 deg 18 min 19.098 sec dLon = (Longitude)$_{dgps}$ − (Longitude)$_{true}$
= (103 deg 56 min 31.746 sec) − (103 deg 56 min 31.711 sec)
= +0.035 arc sec
= +1.05 meters
= +1.1 meters (rounded)

dLat = (Latitude)$_{dgps}$ − (Latitude)$_{true}$
= (1 deg 18 min 19.098 sec) − (1 deg 18 min 19.106 sec)
= −0.008 arc sec
= −0.24 meters
= −0.2 meters (rounded)

Total Error = 2D Error = $\sqrt{(dLon)^2 + (dLat)^2}$
= $\sqrt{(1.05)^2 + (-0.24)^2}$
= +1.08 meters
= +1.1 meters (rounded)

The inputs to the neural network 16 may be the values of pseudo ranges to various GPS satellites 20 measured directly by the GPS receiver 12 and the outputs could include corrections to the pseudo ranges. Other inputs could include GPS time or satellite number. Outputs from the neural network 16 may also be estimates of various components of the total positioning error encountered in GPS estimated position. These error components include the Ionospheric delay, Tropospheric delay, selective availability (SA) errors, multi-path errors, and the like.

The measurements from the GPS can be in any one of the various known coordinate systems, such as Earth Centered Earth Fixed (ECEF), Spherical Coordinates, Military Grid Reference System (MGRS), or Universal Transverse Mercator (UTM). Regardless of which coordinate system is used, the coordinates need to be first scaled in appropriate units and then variable digits of the converted values are used as inputs to the neural network 16. Accordingly, the number of inputs to the neural network 16 may be different depending upon the coordinate system used.

The outputs of the neural network 16 may also take various forms. Regardless of the form, the outputs must be properly scaled to avoid straddling of the neural network 16 at a sub-optimal point during the training process. It is also possible that the neural network would not converge for ill conditioned outputs. Again, the number of outputs may be different depending upon the coordinate system used.

The preferred embodiment of the system 10 uses a three layer feedforward neural network. However, a military (P-code) GPS receiver might operate better using another type of neural network configuration. If the input and output configurations are changed, other neural networks might operate better. In particular, a change in the number of inputs and/or outputs would lead to a change in the number of neurons in the hidden layer.

A three layer neural network having the following configuration is also within the scope of the invention:

(1) An input layer consisting of pseudorange values from a set of six to ten satellites. Each pseudorange may be broken down into one of several input nodes in the same manner as above wherein input digits for longitude and latitude values are broken down. Alternatively, each pseudorange could be input as whole values into the neural network.

(2) One or more hidden layers using 200 or more neurons.

(3) The output may consist of corrected pseudoranges or corrections to be applied to measured values of pseudoranges.

Additional inputs and/or outputs may also be provided.

Different types of neural networks 16 and different sizes of hidden layers are possible for neural networks trained for commercial (C/A Code) and military (P-Code) GPS receivers. The selection of the type and size of the neural network 16 will also depend upon the input/output configuration selected for the neural network implementation.

COMPARISON OF PRESENT INVENTION WITH PRIOR ART

FIG. 11 is a table of observed coordinate data collected using the same GPS receiver 1 used to obtain the data in FIG. 8. No corrections were applied to the data in FIG. 11. That is, no base station signals, such as real time differential GPS corrections, were used to correct the received coordinate data, and no neural network derived corrections were applied.

FIG. 12 is a table of observed coordinate data collected using the same GPS receiver 2 used to obtain the data in FIG. 9. Again, no corrections were applied to the data in FIG. 12.

A comparison of FIGS. 8 and 11, and FIGS. 9 and 12 show that the present invention results in a dramatic improvement in the accuracy of the coordinate data for most readings. A small number of coordinate data values have large errors, even when using the present invention. However, the errors for most coordinate data values are significantly smaller than the errors resulting from use of a GPS with no corrections.

Occasional large and unacceptable errors may be optionally reduced by using estimation and smoothing techniques, such as a Kalman Filter, data smoothing algorithm, error checking algorithm, or the like. If such techniques are used, they would become a part of the system operation on a continual basis and would work on the premise that in a practical system, sudden changes of large magnitudes are unlikely events and hence should not be considered as valid observations. For example, in a navigation system, a vehicle may be moving from one point to another and limited errors are encountered. A continual history of these errors would be incorporated into a smoothing algorithm. Thus, the algorithm would predict the value of the next data expected on a continual basis. When the actual measurement data is received, the system compares it to what was expected and smooths out the error.

The present invention also provides equal or better average coordinate data position errors than prior art DGPS systems which rely upon base station signals. The present invention thus avoids the necessity of installing, maintaining and relying upon base station signals to obtain improved coordinate data accuracy.

EXTENSION OF PRESENT INVENTION TO LARGER AREAS

Figure 13:
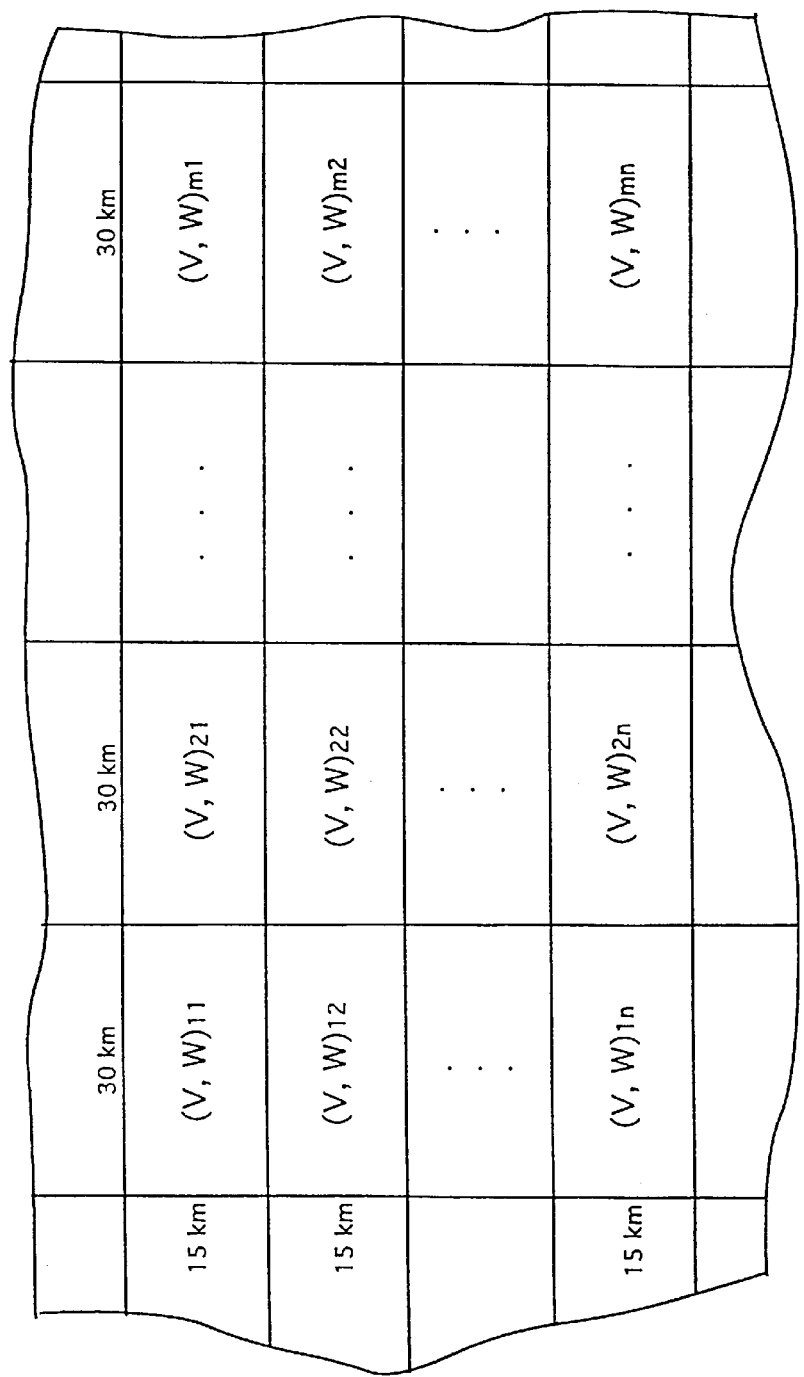
FIG. 13 shows the division of Earth' surface into a network of grids for allowing use of the system on a regional or global basis.
Figure 14:
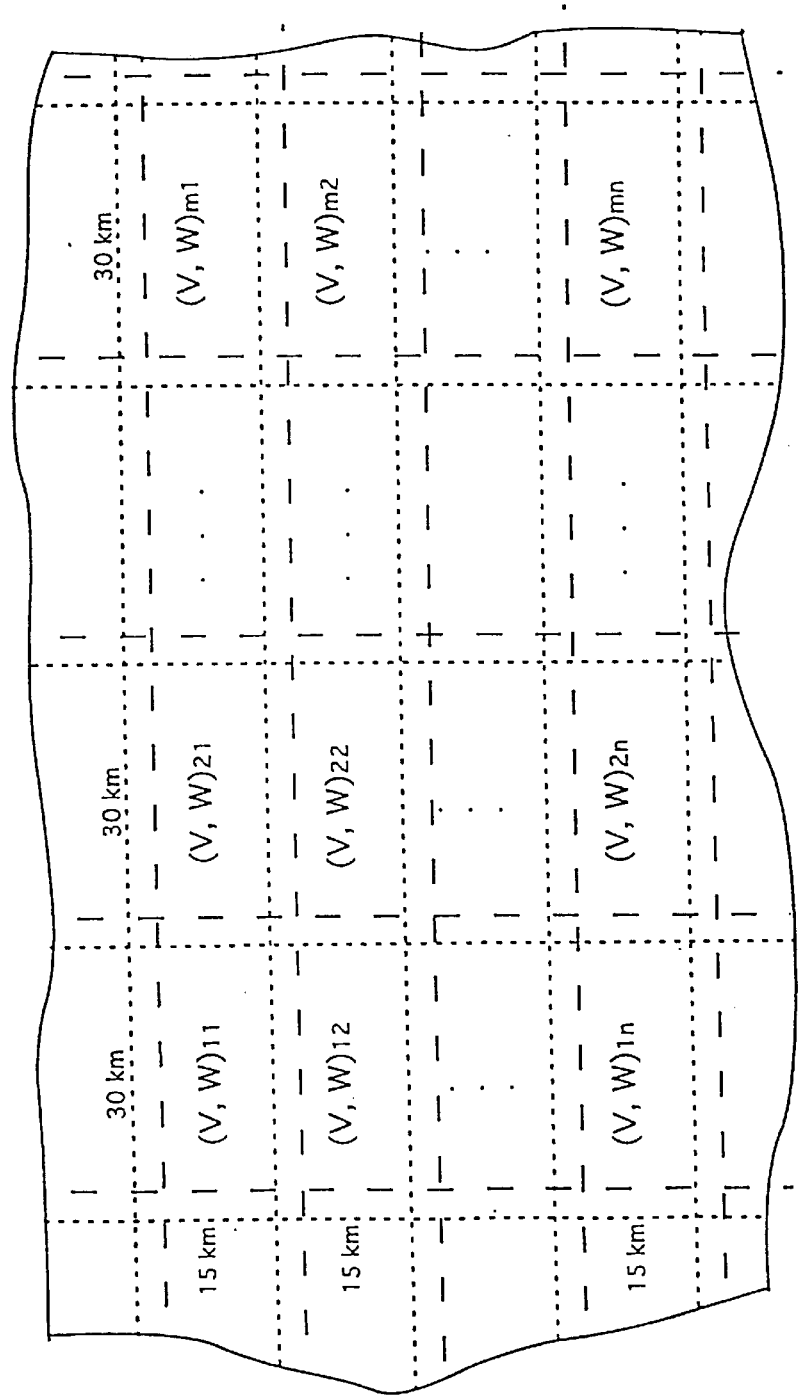
FIG. 14 shows an alternative method of dividing the Earth's surface into a network of grids for allowing use of the system on a regional or global basis.

As discussed above, the system 10 is designed to function within a predefined region of 30 km (E-W) by 15 km (N-S). However, the use of the system 10 may be extended to larger areas by dividing the Earth's surface into a network of grids of 30 km (E-W) by 15 km (N-S), as shown in FIG. 13. For practical implementation of the system 10 throughout the world, grids will overlap, as shown in FIG. 14. The weight matrices may be the same or different for several grids. As faster and cheaper processing capabilities become available, the grid size that can be handled by the neural network 16 will increase. This will reduce the total number of grids in a worldwide network of grids shown in FIGS. 13 and 14.

TRAINING THE NEURAL NETWORK

Figure 15:
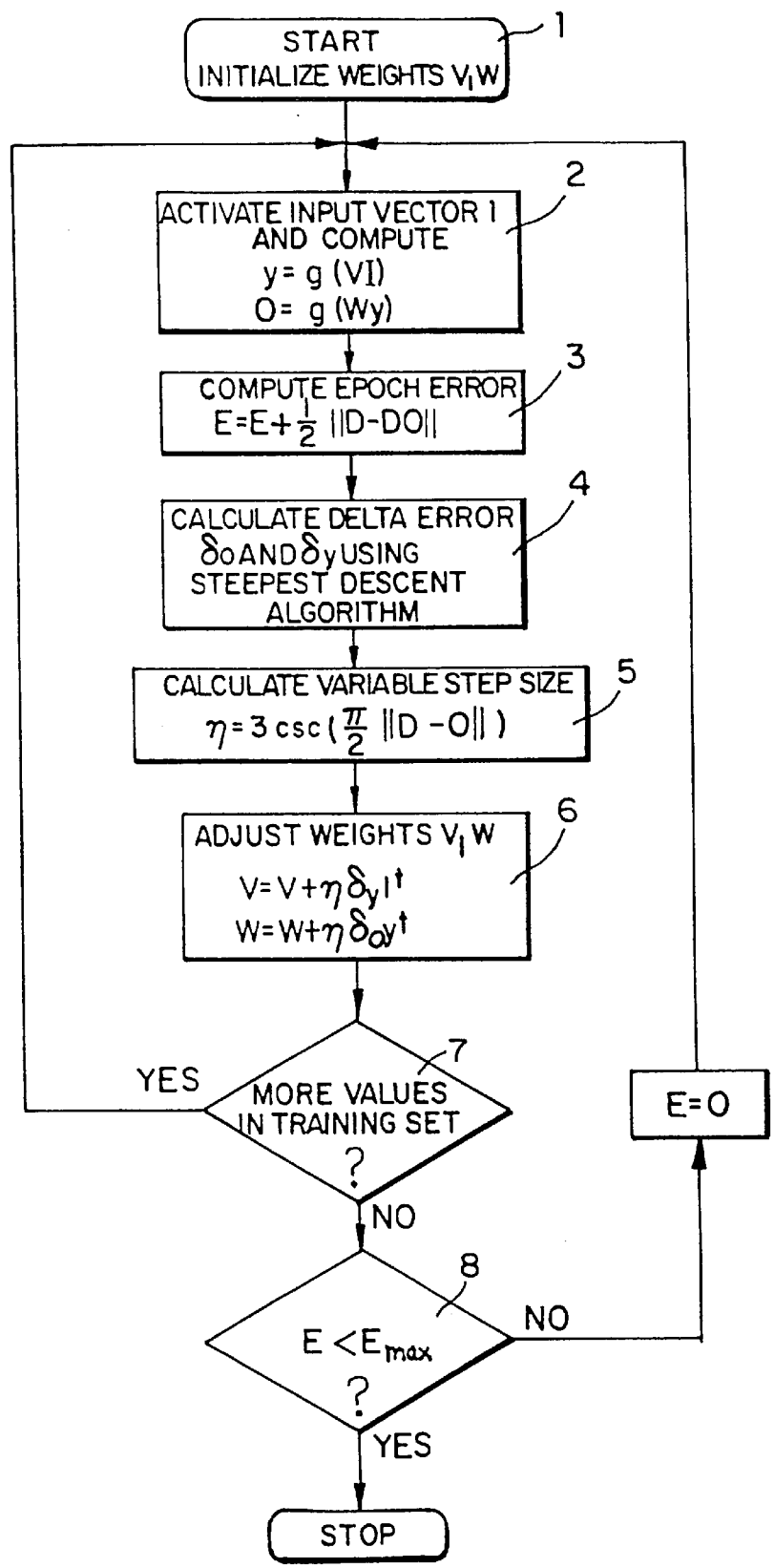
FIG. 15 is a flowchart showing the steps for training the neural network of FIGS. 2 and 3.

FIG. 15 is a flowchart showing the steps for training the neural network 16 of FIGS. 2 and 3. The neural network 16 is trained using a supervised feedforward error back-propagation training algorithm. This type of algorithm is preferred because it has high noise resistance. The algorithm permits experiential acquisition of input/output mapping within the multilayer network. The initial weights of the network are randomly selected and thus all output from the network 16 is also random. The training phase corrects the weights of the network 16 so that the network output is close to the desired output. Referring to FIG. 15, the step by step training procedure is as follows:

Step 1: Initialize the weights of the two layers represented by matrices V and W. The random number generator function is used to randomly assign values between −1 and +1 to the elements of V and W. For repeatability, it may be desired to use a seed of O for the random number generator.

Step 2: The vector I of input values is propagated forward through the neural network 16 such that, $$y = g(VI), \text{ and}$$

$$o = g(Wy).$$

where,

I= vector of the inputs to the neural network o= vector of the outputs from the neural network, and y= vector of the outputs of the hidden layer of the neural network Step 3: The epoch error is computed (updated). This is done by calculating the cycle error and then adding to the previous epoch error, i.e., $$E + \tfrac{1}{2} \|D - O\| \rightarrow E$$

where,

D= vector of desired outputs corresponding to the input vector I, and

O= actual output vector obtained.

Step 4: Calculate the delta errors $\delta_o$ and $\delta_y$ using the steepest descent approach.

Step 5: Calculate step size $\eta$ such that, $$\eta = A \csc(\pi/2 \|D - O\|),$$

where,

A=3 for the best mode of invention.

Step 6: Adjust the weights of the hidden and output layers such that, $$V + \eta \delta_y I_t \rightarrow V,$$

$$W + \eta \delta_o y^t \rightarrow W.$$

Step 7: If there are more input values in the training set, then return to Step 2.

Step 8: If the epoch error is less than the predetermined threshold value, the training is complete and the network is properly trained within the limits of the input data set. If the epoch error is not less than the threshold value, the entire training cycle is repeated, that is, return to Step 2 and start with I input vector again.

The method described herein trains the neural network 16 using data from one type of commercial or military GPS receiver. However, once trained, the same neural network 16 may be used with other GPS receivers, thereby avoiding the necessity to separately train each GPS controller based on a neural network. The data from GPS receiver 2 was used to train a neural network suitable for use therewith. The same neural network was then used with the GPS receiver 1. FIGS. 8 and 9 provide samples of data from receivers 1 and 2, respectively, for which the performance of the neural network 16 was tested. Experimental data has thus demonstrated the viability of training a neural network on a first GPS receiver and using the same neural network in other GPS receivers. Generally, a GPS receiver having a wider spread of observation data is preferred for training.

The data used for training the neural network 16 has to be properly selected. When multiple GPS receivers share the same V and W weight matrices, the data should not correspond to the best performance system. That is, the data from the GPS receiver which provides best estimates of the position of a point is preferably not used for training the neural network 16. Instead, data from the GPS receiver which is less accurate should preferably be used for training the neural network 16.

Retraining of the neural network 16 may be necessary based upon the age of the existing neural network 16, operational changes in the GPS itself, or as the GPS receiver 12 which uses the neural network 16 is moved from one geographical region to another region.

Other methods may be used for training the neural network 16, especially if other types of neural network configurations are used.

Other variations of the present invention, without limitation, are listed below.

(1) The system 10 is described in a static positioning environment. However, the system 10 could potentially be adapted for use in a dynamic positioning environment (e.g., navigation).

(2) The neural network 16 described above may be applicable to a circular area having a radius equal to 200–300 km. Further extensions may be possible by dividing the Earth into a network of interleaving circular grids similar to the network commonly used for cellular telephones.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. An apparatus adapted to improve the accuracy of signals associated with a global positioning system (GPS), the apparatus including:
   (a) a data conditioner for receiving uncorrected, measured coordinate data from a GPS receiver, processing the coordinate data, and outputting a plurality of discrete values, the plurality of discrete values being directly related to the coordinate data; and
   (b) an artificial neural network comprising:
      (i) an input layer having a plurality of inputs, each input receiving one of the plurality of discrete values,
      (ii) processing nodes, neurons and weights for mathematically manipulating the inputted values, and
      (iii) an output layer for outputting coordinate data correction values.

2. An apparatus according to claim 1 further comprising:
   (c) an output processor for:
      (i) receiving the coordinate data correction values and the uncorrected, measured coordinate data,
      (ii) mathematically manipulating the coordinate data correction values and the uncorrected, measured coordinate data, and
      (iii) outputting corrected coordinate data.

3. An apparatus according to claim 2 wherein the uncorrected measured coordinate data includes latitude and longitude.

4. An apparatus according to claim 3 wherein the plurality of discrete values which are output from the data conditioner, and subsequently input into the input layer of the neural network, are a predetermined number of least significant digits of the uncorrected latitude and longitude.

5. An apparatus according to claim 4 wherein there are nine discrete values, I1–I9, and I1–I5 are the five least significant digits of the longitude measurement in arc seconds, the input I5 also including one significant digit in fractions of an arc second, and I6–I9 are the four least significant digits of the latitude measurement in arc seconds, the input I9 also including one significant digit in fractions of an arc second.

6. An apparatus according to claim 2 wherein the output processor mathematically manipulates the coordinate data correction values and the uncorrected, measured coordinate data by subtracting the coordinate data correction values from the uncorrected, measured coordinate data.

7. An apparatus according to claim 1 wherein the neural network is a three layer feedforward neural network.

8. An apparatus according to claim 1 wherein the neural network includes a hidden layer between the input layer and the output layer, and the weights include weight matrix V between the input layer and the hidden layer, and a weight matrix W between the hidden layer and the output layer.

9. An apparatus according to claim 1 wherein the uncorrected, measured coordinate data is received from an array of orbiting satellites.

10. A global positioning satellite (GPS) receiver comprising:
   (a) a receiver circuit for receiving uncorrected, measured coordinate data from a GPS network;
   (b) a data conditioner for processing the uncorrected, measured coordinate data and outputting a plurality of discrete values, the plurality of discrete values being directly related to the coordinate data;
   (c) an artificial neural network comprising:
      (i) an input layer having a plurality of inputs, each input receiving one of the plurality of discrete values,
      (ii) processing nodes, neurons and weights for mathematically manipulating the inputted values, and
      (iii) an output layer for outputting coordinate data correction values; and
   (d) an output processor for:
      (i) receiving the coordinate data correction values and the, measured uncorrected coordinate data,
      (ii) mathematically manipulating the coordinate data correction values and the uncorrected, measured coordinate data, and
      (iii) outputting corrected coordinate data.

11. A GPS receiver according to claim 10 wherein the uncorrected, measured coordinate data includes latitude and longitude.

12. A GPS receiver according to claim 11 wherein the plurality of discrete values which are output from the data conditioner, and subsequently input into the input layer of the neural network, are a predetermined number of least significant digits of the uncorrected latitude and longitude.

13. A GPS receiver according to claim 12 wherein there are nine discrete values, I1–I9, and I1–I5 are the five least significant digits of the longitude measurement in arc seconds, the input I5 also including one significant digit in fractions of an arc second, and I6–I9 are the four least significant digits of the latitude measurement in arc seconds, the input I9 also including one significant digit in fractions of an arc second.

14. A GPS receiver according to claim 10 wherein the neural network is a three layer feedforward neural network.

15. A GPS receiver according to claim 10 wherein the neural network includes a hidden layer between the input layer and the output layer, and the weights include weight matrix V between the input layer and the hidden layer, and a weight matrix W between the hidden layer and the output layer.

16. A GPS receiver according to claim 10 wherein the output processor mathematically manipulates the coordinate data correction values and the uncorrected, measured coordinate data by subtracting the coordinate data correction values from the uncorrected, measured coordinate data.

17. A GPS receiver according to claim 10 wherein the uncorrected, measured coordinate data is received from an array of orbiting satellites.

18. An apparatus adapted to improve the accuracy of signals associated with a global positioning system (GPS), the apparatus including:
(a) a data conditioner for receiving uncorrected, measured latitude and longitude data from a GPS receiver, processing the latitude and longitude data, and outputting a predetermined number of least significant digits of the uncorrected latitude and longitude; and
(b) an artificial neural network comprising:
(i) an input layer having a plurality of inputs, each input receiving one of the least significant digits,
(ii) processing nodes, neurons and weights for mathematically manipulating the inputted digits,
(iii) an output layer for outputting latitude and longitude correction values.

19. An apparatus according to claim 18 further comprising:
(c) an output processor for:
(i) receiving the latitude and longitude correction values and the uncorrected, measured latitude and longitude data,
(ii) subtracting the latitude and longitude correction values from the uncorrected, measured latitude and longitude data, and
(iii) outputting corrected latitude and longitude data.

20. An apparatus according to claim 19 wherein there are nine inputs, I1–I9, and I1–I5 are the five least significant digits of the longitude measurement in arc seconds, the input I5 also including one significant digit in fractions of an arc second, and I6–I9 are the four least significant digits of the latitude measurement in arc seconds, the input I9 also including one significant digit in fractions of an arc second.

21. An apparatus according to claim 18 wherein the neural network includes a hidden layer between the input layer and the output layer, and the weights are associated with a weight matrix V between the input layer and the hidden layer, and a weight matrix W between the hidden layer and the output layer.

22. A method for correcting raw, measured coordinate data associated with a global positioning system (GPS) by processing the raw, measured coordinate data through a neural network, the method comprising the steps of:
(a) obtaining raw, measured coordinate data from a GPS receiver;
(b) processing the raw, measured coordinate data to obtain a plurality of discrete values, the plurality of discrete values being directly related to the coordinate data;
(c) inputting the plurality of discrete values into an input layer of a neural network, the input layer having a plurality of inputs, each input receiving one of the plurality of discrete values;
(d) mathematically manipulating the input valves with processing nodes, neurons and weights of the neural network; and
(e) outputting coordinate data correction values from an output layer of the neural network.

23. A method according to claim 22 further comprising the step of:
(f) obtaining corrected coordinate data by mathematically manipulating the coordinate data correction values and the raw, measured coordinate data.

24. A method according to claim 23 wherein step (f) includes mathematically manipulating the coordinate data correction values and the raw, measured coordinate data by subtracting the coordinate data correction values from the raw, measured coordinate data.

25. A method according to claim 22 wherein step (a), the coordinate data includes latitude and longitude.

26. A method according to claim 27 wherein step (b) includes the step of processing the raw, measured latitude and longitude data to obtain a predetermined number of least significant digits of the raw, measured latitude and longitude data, and step (c) includes the step of inputting the least significant digits into the input layer of the neural network.

27. A method according to claim 26 wherein in step (b), there are nine discrete values, I1–I9, and I1–I5 are the five least significant digits of the longitude measurement in arc seconds, the input I5 also including one significant digit in fractions of an arc second, and I6–I9 are the four least significant digits of the latitude measurement in arc seconds, the input I9 also including one significant digit in fractions of an arc second.

28. A method according to claim 22 wherein steps (c), (d) and (e) are performed by a three layer feedforward neural network.

29. A method according to claim 22 wherein steps (c), (d) and (e) are performed by a neural network which includes a hidden layer between the input layer and the output layer, and having weights including a weight matrix V between the input layer and the hidden layer, and a weight matrix W between the hidden layer and the output layer.

30. A method according to claim 22 wherein, in step (a), the GPS receiver receives the raw, measured coordinate data from an array of orbiting satellites.

* * * * *